(12) United States Patent
Huang et al.

(10) Patent No.: US 10,572,611 B2
(45) Date of Patent: Feb. 25, 2020

(54) METHOD AND SYSTEM FOR CHARACTERIZING FRACTURES IN A SUBSURFACE REGION

(71) Applicants: Hao Huang, The Woodlands, TX (US); Gauthier D. Becker, The Woodlands, TX (US); Rodrick Myers, Houston, TX (US)

(72) Inventors: Hao Huang, The Woodlands, TX (US); Gauthier D. Becker, The Woodlands, TX (US); Rodrick Myers, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 325 days.

(21) Appl. No.: 15/496,249

(22) Filed: Apr. 25, 2017

(65) Prior Publication Data

US 2017/0316128 A1 Nov. 2, 2017

Related U.S. Application Data

(60) Provisional application No. 62/446,702, filed on Jan. 16, 2017, provisional application No. 62/446,711, filed on Jan. 16, 2017, provisional application No. 62/446,706, filed on Jan. 16, 2017, provisional application No. 62/329,681, filed on Apr. 29, 2016.

(51) Int. Cl.
*G06F 17/50* (2006.01)
*G01V 99/00* (2009.01)

(52) U.S. Cl.
CPC ........ *G06F 17/5009* (2013.01); *G01V 99/005* (2013.01); *G01V 2210/646* (2013.01); *G01V 2210/66* (2013.01); *G06F 2217/16* (2013.01)

(58) Field of Classification Search
CPC ............ G06F 17/5009; G06F 2117/16; G01V 2210/646
USPC ........................ 166/250.01, 252.5; 703/10, 2
See application file for complete search history.

(56) References Cited

U.S. PATENT DOCUMENTS

| | | | |
|---|---|---|---|
| 6,810,332 B2 | 10/2004 | Harrison | |
| 6,826,483 B1 | 11/2004 | Anderson et al. | |
| 6,842,725 B1 * | 1/2005 | Sarda | G01V 11/00 703/10 |
| 6,985,841 B2 | 1/2006 | Barroux | |
| 7,509,245 B2 * | 3/2009 | Siebrits | E21B 43/26 702/1 |

(Continued)

OTHER PUBLICATIONS

Hughes, T.J.R. (1987) "The Finite Element Method—Linear Static and Dynamic Finite Element Analysis", Front—2 pages and Table of Contents, pp. iii to x; ISBN-13: 978-0486411811.

(Continued)

*Primary Examiner* — Thai Q Phan
(74) *Attorney, Agent, or Firm* — ExxonMobil Upstream Research Company—Law Department

(57) ABSTRACT

A method and system are described for characterizing fractures in subsurface regions, using the fracture characterizations in subsurface models, and using the subsurface models in hydrocarbon operations. In the methods and systems, one or more zones are identified in a subsurface model for fracture characterization; a multi-layer model is created for the selected zone; and macromechanical geological loads are applied and simulated to generate fractures for the zone.

21 Claims, 6 Drawing Sheets

(56) References Cited

U.S. PATENT DOCUMENTS

| | | | |
|---|---|---|---|
| 7,526,418 B2 | 4/2009 | Pita et al. | |
| 7,542,850 B2 | 6/2009 | Humphrey et al. | |
| 7,565,278 B2* | 7/2009 | Li | G06F 17/5018 703/10 |
| 7,596,480 B2 | 9/2009 | Fung et al. | |
| 7,617,082 B2 | 11/2009 | Childs et al. | |
| 7,676,326 B2 | 3/2010 | Podladchikov et al. | |
| 7,809,538 B2 | 10/2010 | Thomas | |
| 8,190,414 B2 | 5/2012 | Huang et al. | |
| 8,219,320 B2 | 7/2012 | Saenger | |
| 8,494,827 B2* | 7/2013 | Mutlu | G06F 17/5018 703/10 |
| 8,577,613 B2 | 11/2013 | Bryant et al. | |
| 8,793,110 B2 | 7/2014 | Myers et al. | |
| 9,085,957 B2 | 7/2015 | Wallace et al. | |
| 9,152,745 B2* | 10/2015 | Glinsky | G06F 17/5009 |
| 2002/0120429 A1 | 8/2002 | Ortoleva | E21B 41/0064 703/2 |
| 2008/0133186 A1* | 6/2008 | Li | G06F 17/5018 703/2 |
| 2011/0011595 A1 | 1/2011 | Huang et al. | |
| 2011/0077918 A1* | 3/2011 | Mutlu | G01V 9/00 703/2 |
| 2011/0272152 A1 | 11/2011 | Kaminsky et al. | |
| 2013/0211807 A1* | 8/2013 | Templeton-Barrett | E21B 43/26 703/10 |
| 2013/0311158 A1 | 11/2013 | Dasari | |
| 2016/0116635 A1* | 4/2016 | Ward | G01V 99/005 703/2 |
| 2016/0124117 A1 | 5/2016 | Huang et al. | |
| 2016/0237342 A1* | 8/2016 | Cannan | C09K 8/805 |
| 2017/0051598 A1* | 2/2017 | Ouenes | E21B 43/26 |
| 2017/0145793 A1* | 5/2017 | Ouenes | E21B 41/0092 |
| 2017/0315249 A1* | 11/2017 | Myers | G06G 7/48 |
| 2017/0315266 A1* | 11/2017 | Myers | G01V 99/005 |
| 2018/0232950 A1* | 8/2018 | Brewer | G06T 17/205 |

OTHER PUBLICATIONS

Hughes, T.J.R. (1987) "The Finite Element Method—Linear Static and Dynamic Finite Element Analysis", Chapter 1 Fundamental Concepts; a Simple One-Dimensional Boundary-Value Problem; pp. 1 to 56.

Hughes, T.J.R. (1987) "The Finite Element Method—Linear Static and Dynamic Finite Element Analysis", Chapter 2 Formulation of Two-and Three-dimensional Boundary-value Problems; pp. 7 to 108.

Hughes, T.J.R. (1987) "The Finite Element Method—Linear Static and Dynamic Finite Element Analysis", Chapter 3 Isoparametric Elements and Elementary Programming Concepts; pp. 109 to 184.

Belytschko, T. et al. (1999) "Elastic crack growth in finite elements with minimal remeshing," *International Journal for Numerical Methods in Engineering*, 45 (5): pp. 601 to 620.

Bourdin, B. et al. (2008) "The Variational Approach to Fracture" *Journal of Elasticity*, 91:pp. 5-148.

Bourne, S. J., (2003) "Contrast of elastic properties between rock layers as a mechanism for the initiation and orientation of tensile failure under uniform remote compression", *Journal of Geophysical Research*, vol. 108, No. B8, 2395, pp. 14-1 to 14-12.

Goktan et al., (2005) "A new methodology for analysis of relationships between brittleness index and drag pick cutting efficiency", *J. S. Afr. Inst. Min. Metall.*, 105, pp. 727-733.

Jager, P., et al. (2008), "Modeling three-dimensional crack propagation—A comparison of crack path tracking strategies", *Int. J. Numer. Methods Eng.* 76, pp. 1328-1352.

Keating, D. P., et al. (2008), "An experimental evaluation of the curvature-strain relation in fault-related folds", *AAPG Bulletin* v. 92, No. (7), 20 pp. 869-884.

Klerck et al. (2004), "Discrete fracture in quasi-brittle materials under compressive and tensile stress states", *Methods in Applied Mechanics and Engineering*, vol. 193, pp. 3035-3056.

Mullen et al., (2012) "Fracability Index— More Than Just Calculating Rock Properties", *SPE Annual Technical Conference and Exhibition*, San Antonio, TX, Oct. 8-10, 2012, SPE 159755 pp. 1-10.

Renshaw, C.E., et al., (2003) "Role of heterogeneity in elastic properties and layer thickness in the jointing of layered sedimentary rocks", *Geophysical Research Letters*, vol. 30, No. 24, 2295, pp. 13-1 to 13-4.

Rickmann, R. et al., (2008) "A practical use of shale petrophysics for stimulation design optimization: all shale plays are not clones of the Barnett Shale", *2008 Annual Technical Conference and Exhibition*, SPE 115258, pp. 1-11.

Thomas A. L. et al. (1993) "The geometry of echelon fractures in rock: implications from laboratory and numerical experiments", *Journal of Structural Geology*, vol. 15, Nos. 3-5, pp. 323-334.

Yagiz, S., (2009) "Assessment of brittleness using rock strength and density with punch penetration test", *Tunneling and Underground Space Technology*, 24, pp. 66-74.

* cited by examiner

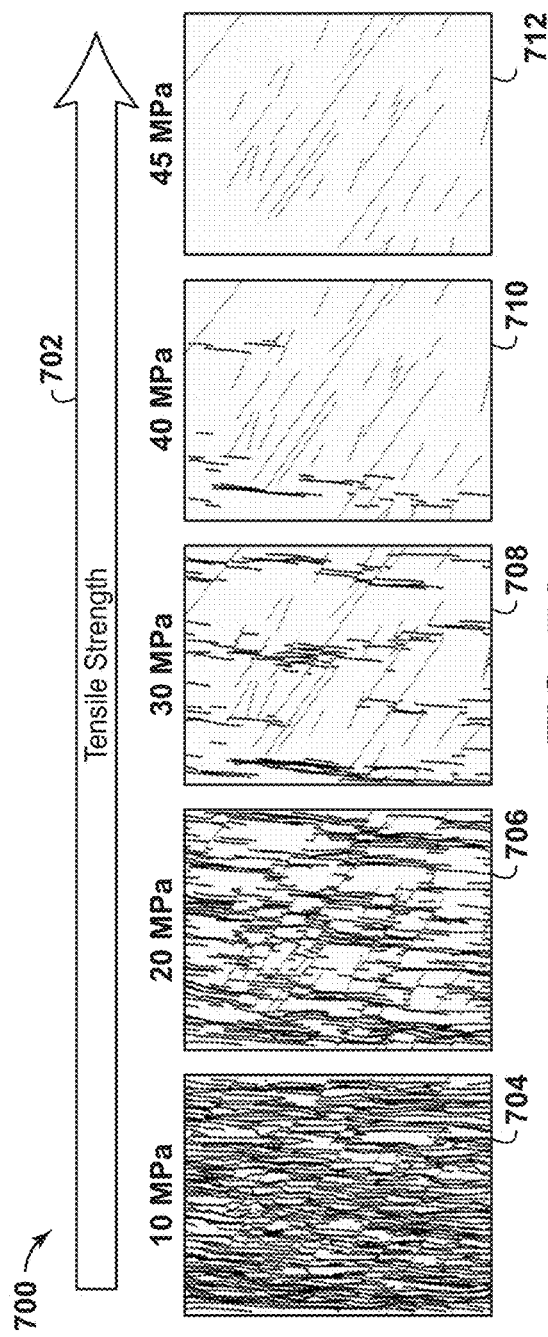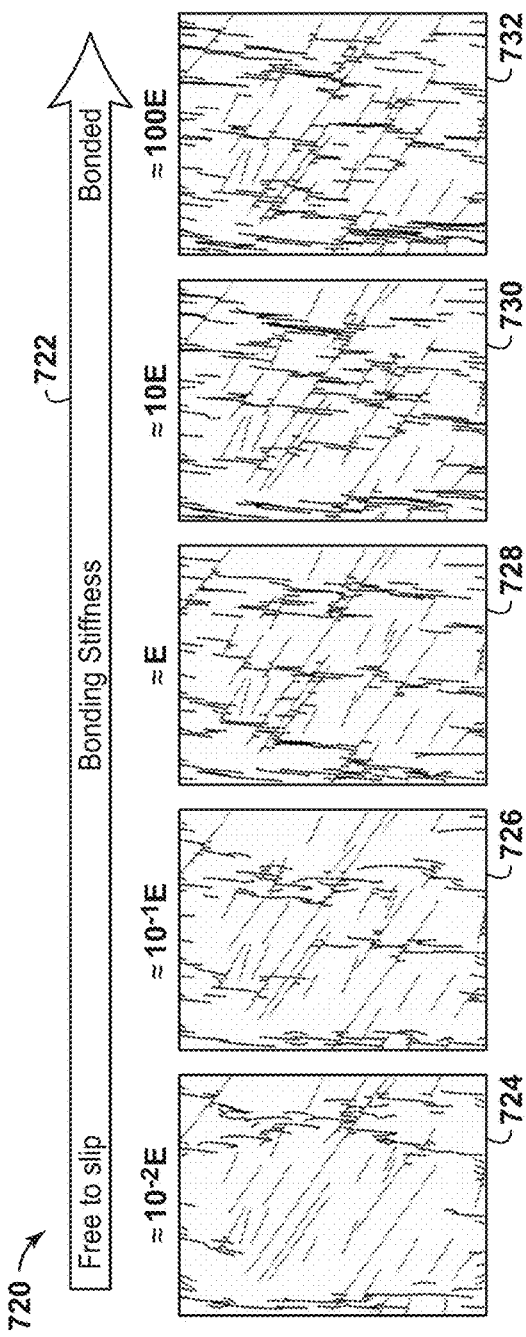
FIG. 7A
FIG. 7B

METHOD AND SYSTEM FOR CHARACTERIZING FRACTURES IN A SUBSURFACE REGION

CROSS REFERENCE TO RELATED APPLICATIONS

This application claims the benefit of U.S. Provisional Patent Application Ser. No. 62/446,711 filed Jan. 16, 2017 entitled "Method and System for Generating and Using a Subsurface Model in Hydrocarbon Operations"; U.S. Provisional Application No. 62/329,681 entitled, "Method and System for Stacking Fracture Prediction", filed on Apr. 29, 2016; U.S. Provisional Application No. 62/446,702, entitled, "Method and System for Stacking Fracture Prediction", filed on Jan. 16, 2017; and U.S. Provisional Application No. 62/446,706, entitled, "Method and System For Forming And Using A Subsurface Model In Hydrocarbon Operations", filed on Jan. 16, 2017, the disclosures of which are each incorporated herein by reference.

FIELD OF THE INVENTION

This disclosure relates generally to the field of hydrocarbon exploration, hydrocarbon development, and hydrocarbon production and, more particularly, to subsurface modeling. Specifically, the disclosure relates to methods and systems for creating subsurface models that characterize present day natural fractures based on numerical evaluation of the genesis of natural fractures. The method may include constructing a subsurface model for a subsurface region and using the subsurface model in simulations and in hydrocarbon operations, such as hydrocarbon exploration, hydrocarbon development, and/or hydrocarbon production.

BACKGROUND

This section is intended to introduce various aspects of the art, which may be associated with exemplary embodiments of the present disclosure. This discussion is believed to assist in providing a framework to facilitate a better understanding of particular aspects of the present invention. Accordingly, it should be understood that this section should be read in this light, and not necessarily as admissions of prior art.

In hydrocarbon exploration, development, and/or production operations, different types of subsurface models may be used to represent subsurface structures, which may include a description of the subsurface structures and material properties for the subsurface region. For example, the subsurface model may comprise one or more of a geomechanical model, a geologic model, or a reservoir model. The subsurface model may represent measured or interpreted data for the subsurface region and may include objects (e.g., horizons, faults, surfaces, volumes, and the like). The subsurface model may also be discretized with a mesh or a grid that includes nodes and forms cells (e.g., voxels or mesh elements) within the model. By way of example, the subsurface model may be created from a structural framework (e.g., organization of objects) and provide defined compartments or subvolumes. The geologic model may represent measured or interpreted data for the subsurface region, such as seismic data and well log data. The geologic model may be within a physical space or domain and may have material properties, such as rock properties. The reservoir model may be used to simulate flow of fluids within the subsurface region. Accordingly, the reservoir model may use the same mesh and/or cells as other models, or may resample or upscale the mesh and/or cells to lessen the computations for simulating the fluid flow.

In the subsurface regions represented by the subsurface model, various fractures and other structures may be present. For example, natural fractures may be present and provide additional impact on the flow of fluids through the reservoir. As a result, natural fractures may influence the movement, storage, and recovery of hydrocarbons. However, for subsurface regions with limited information, it can be difficult and problematic to predict fracture characteristics.

As an example, curvature analysis may be used to provide fractures, which uses current time period information. As a specific example, Keating describes that curvature analysis is typically utilized to predict the location and characteristics of fracture networks. See, e.g., Keating D. P., and Fischer, M. P., 2008, *An experimental evaluation of the curvature-strain relation in fault-related folds*, AAPG Bulletin v. 92, no. (7), 20 p. 869-884. However, curvature analysis may be problematic because it relies on 2D or 3D restoration or curvature analyses which may have limited power for fracture prediction. That is, the curvature analysis does not represent the entire macromechanical deformation process, as it does not involve simulating load. As a result, curvature analysis may be limited and may not always be used as a direct proxy for strain, as the dip and throw may be crucial factors. Additionally, it is difficult to qualitatively correlate the curvatures with fracture density and interaction during fracture genesis as loads change.

Accordingly, there remains a need in the industry for methods and systems that are more efficient and may lessen problems associated with characterizing fractures in a subsurface model (e.g., a geomechanical model, a geologic model, or a reservoir model) for use in hydrocarbon operations. Further, a need remains for efficient approaches to generate subsurface models that characterize natural fractures by using physics-based numerical methods to simulate the genesis of natural fractures. The present techniques provide methods and systems that overcome one or more of the deficiencies discussed above.

SUMMARY

In one embodiment, a method for characterizing fractures for a subsurface region is described. The method may comprise: obtaining a subsurface model associated with a subsurface region; identifying a zone in the subsurface model for fracture characterization; creating a multi-layer model for the selected zone; determining macromechanical geological loads to be applied to the multi-layer model; simulating the multi-layer model based on the macromechanical geological loads to represent fracture generation, which includes fracture interaction and fracture intersection; and outputting the fracture characterization results from the simulation of the multi-layer model, wherein the fracture characterization results comprises one of fracture density, fracture orientation, fracture location, fracture geometry, fracture aperture, effective permeability, fracture connectivity, and any combination thereof.

In embodiment, a system for generating a subsurface model associated with a subsurface region is described. A system for generating a subsurface model associated with a subsurface region, comprising: a processor; an input device in communication with the processor and configured to receive input data associated with a subsurface region; memory in communication with the processor, the memory having a set of instructions. The set of instructions, when executed by the processor, are configured to: obtain a subsurface model associated with a subsurface region from memory; identify a zone in the subsurface model for fracture characterization; create a multi-layer model for the selected zone; determine macromechanical geological loads to be applied to the multi-layer model; simulate the multi-layer model based on the macromechanical geological loads to represent fracture generation, which includes fracture interaction and fracture intersection; and output the fracture characterization results from the simulation of the multi-layer model, wherein the fracture characterization results comprises one of fracture density, fracture orientation, fracture location, fracture geometry, fracture aperture, effective permeability, fracture connectivity, and any combination thereof.

In certain embodiments, the method and/or system may include certain enhancements. The creating the multi-layer model may include: defining the zone for numerical evaluation; separating the multi-layer model into one or more stratigraphic layers; constructing a mesh for the zone, wherein the mesh partitions the zone into various mesh elements; and assigning material constitutive relationships for each of the stratigraphic layers and properties to the mesh elements. The method may also include wherein the simulating the multi-layer model based on the macromechanical geological loads represents generation of natural fractures; wherein the multi-layer model is seeded with one or more fractures prior to performing the simulating the multi-layer model based on the macromechanical geological loads; wherein identifying the zone in the subsurface model is based on locations associated with measured data; wherein the measured data comprises core sample data, image logs, mini fracture test data, drill stem test data, and any combination thereof performing a simulation of the subsurface model using the fracture characterization results; performing a hydrocarbon operation based on the fracture characterization results; determining the macromechanical geological loads based on one of burial history, a global model that represents the tectonics of the zone, and any combination thereof. Also, the method may include adjusting the macromechanical geological loads by loading increments for each of a plurality of loading steps based on a comparison of the fracture characterization results with a threshold; wherein the fracture characterization results include fracture density and the threshold is less than 10% of the fracture density; and/or wherein the loading increments comprise at least one coarse scale increment and at least one fine scale increment, wherein the at least one fine scale increment is smaller than the at least one coarse scale increment.

In addition, the simulating the multi-layer model based on the macromechanical geological loads may include performing a plurality of loading steps, wherein each loading step comprises: (i) solving one or more conservation of linear momentum equations associated with the zone; (ii) determining if the solution for any mesh elements in the multi-layer model exceed a fracture initiation or propagation criterion; (iii) if the solution for any of the mesh elements does not exceed the fracture initiation or propagation criterion, continuing to step (v); (iv) if the solution for the conservation of linear momentum equations of the mesh elements exceed the fracture initiation or propagation criterion, further comprising (a) selecting the mesh element (e.g., one or more mesh elements) associated with the solution for the conservation of linear momentum equations that exceeds the fracture initiation or propagation criterion by the largest absolute value as the mesh element to fracture; (b) determining fracture surface direction in the mesh element to be fractured based on fracture growth direction criteria; (c) calculating one or more level set values based on the fracture surface direction; (d) determining sub-regions for the mesh element based on the one or more level set values; and (e) repeating to step (i) using the determined sub-regions to represent the mesh element; and (v) storing the fracture characterization results for the loading step. Further, the solving of conservation of linear momentum equation may comprise solving the expression: $\nabla \cdot \sigma + \rho g = 0$, where g is gravity, $\rho$ is rock density and $\sigma$ is total stress; wherein the solving of the conservation of linear momentum equation includes an enrichment term to capture discontinuities associated with displacements in the zone; and wherein the solving of conservation of linear momentum equation comprises solving the expression:

$$u^h(x) = \sum_{i=1}^{Ne} N_i(x)u_i + \sum_{k=1}^{Nf} \sum_{i=1}^{Ne} N_i(x)a_i^k(H_k(x) - H_k(x_i))D_k(x)$$

where $u^h$ is interpolation of displacement, k is the fracture, $H_k$ is the jump function for the fracture k, $D_k$ is a domain function for the fracture k, $N^e$ is number of nodes in the mesh element, i is the node, x is the location, $x_i$ is location of $i^{th}$ node, $u_i$ is displacement of the node i, $N^f$ is number of fractures, $a_i$ is enrichment unknown of the node i, and $N_i$ is the shape function of the node i.

BRIEF DESCRIPTION OF THE DRAWINGS

The advantages of the present invention are better understood by referring to the following detailed description and the attached drawings.

FIGS. 7A and 7B are exemplary diagrams associated with partial results of a series of fracture simulation for a zone.

DETAILED DESCRIPTION

Figure 1:
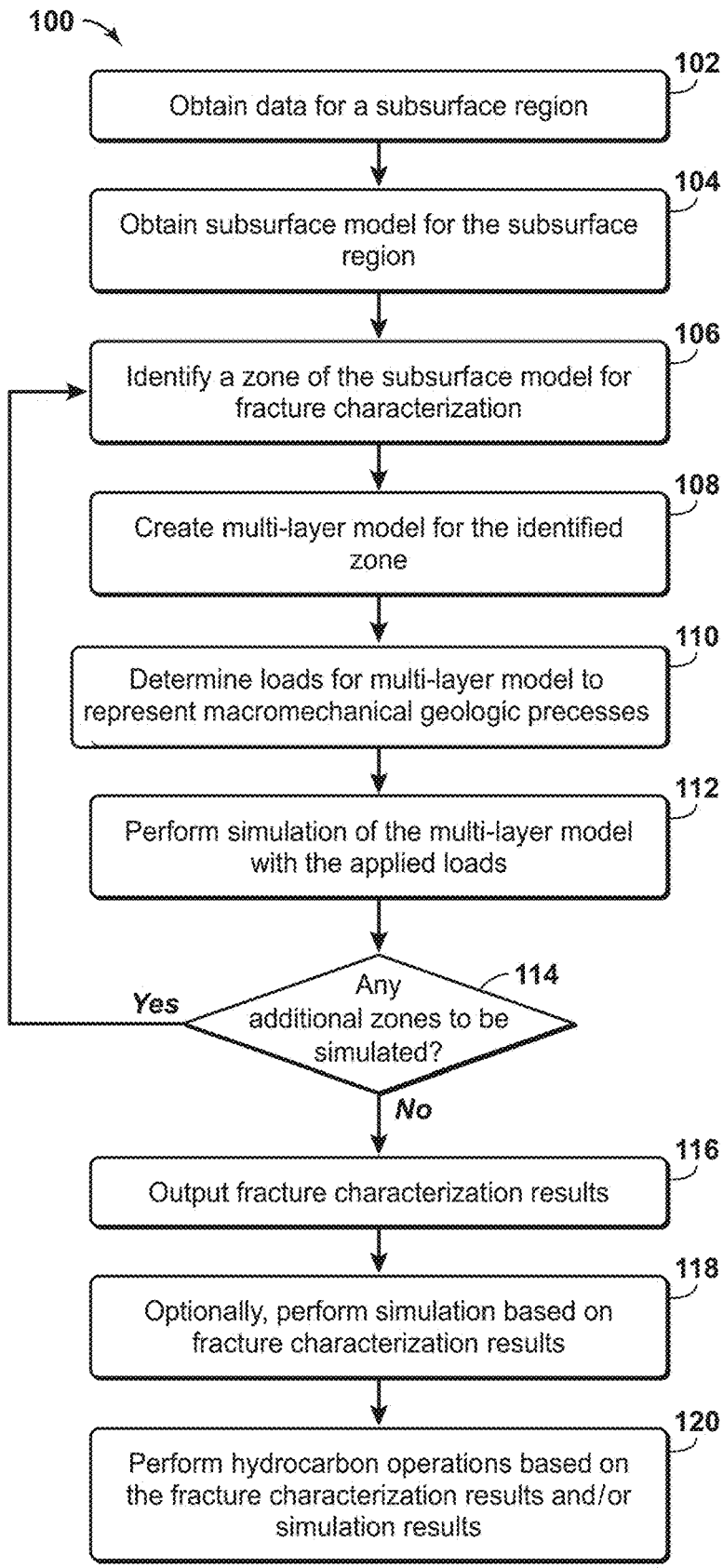
FIG. 1 is an exemplary flow chart in accordance with an embodiment of the present techniques.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

The articles "the", "a", and "an" are not necessarily limited to mean only one, but rather are inclusive and open ended so as to include, optionally, multiple such elements.

As used herein, the term "hydrocarbons" are generally defined as molecules formed primarily of carbon and hydrogen atoms such as oil and natural gas. Hydrocarbons may also include other elements or compounds, such as, but not limited to, halogens, metallic elements, nitrogen, oxygen, sulfur, hydrogen sulfide ($H_2S$), and carbon dioxide ($CO_2$). Hydrocarbons may be produced from hydrocarbon reservoirs through wells penetrating a hydrocarbon containing formation. Hydrocarbons derived from a hydrocarbon reservoir may include, but are not limited to, petroleum, kerogen, bitumen, pyrobitumen, asphaltenes, tars, oils, natural gas, or combinations thereof. Hydrocarbons may be located within or adjacent to mineral matrices within the earth, termed reservoirs. Matrices may include, but are not limited to, sedimentary rock, sands, silicilytes, carbonates, diatomites, and other porous media.

As used herein, "hydrocarbon exploration" refers to any activity associated with determining the location of hydrocarbons in subsurface regions. Hydrocarbon exploration normally refers to any activity conducted to obtain measurements through acquisition of measured data associated with the subsurface formation and the associated modeling of the data to identify potential locations of hydrocarbon accumulations. Accordingly, hydrocarbon exploration includes acquiring measurement data, modeling of the measurement data to form subsurface models, and determining the likely locations for hydrocarbon reservoirs within the subsurface. The measurement data may include seismic data, gravity data, magnetic data, electromagnetic data, and the like.

As used herein, "hydrocarbon development" refers to any activity associated with planning of extraction and/or access to hydrocarbons in subsurface regions. Hydrocarbon development normally refers to any activity conducted to plan for access to and/or for production of hydrocarbons from the subsurface formation and the associated modeling of the data to identify preferred development approaches and methods. By way of example, hydrocarbon development may include modeling of the subsurface formation and extraction planning for periods of production, determining and planning equipment to be utilized and techniques to be utilized in extracting the hydrocarbons from the subsurface formation, and the like.

As used herein, "hydrocarbon operations" refers to any activity associated with hydrocarbon exploration, hydrocarbon development and/or hydrocarbon production.

As used herein, "hydrocarbon production" refers to any activity associated with extracting hydrocarbons from subsurface location, such as a well or other opening. Hydrocarbon production normally refers to any activity conducted to form the wellbore along with any activity in or on the well after the well is completed. Accordingly, hydrocarbon production or extraction includes not only primary hydrocarbon extraction, but also secondary and tertiary production techniques, such as injection of gas or liquid for increasing drive pressure, mobilizing the hydrocarbon or treating by, for example, chemicals, hydraulic fracturing the wellbore to promote increased flow, well servicing, well logging, and other well and wellbore treatments.

As used herein, "subsurface model" refers to a model of a subsurface region and may include a reservoir model, geomechanical model, and/or a geologic model. The subsurface model may include subsurface data distributed within the model in two-dimensions (e.g., distributed into a plurality of cells, such as mesh elements or blocks), three-dimensions (e.g., distributed into a plurality of voxels), or more dimensions.

As used herein, a "geologic model" is a model (e.g., a two-dimensional model or a three-dimensional model) of the subsurface region having static properties and includes objects, such as faults and/or horizons, and properties, such as facies, lithology, porosity, permeability, or the proportion of sand and shale.

As used herein, a "reservoir model" is a model (e.g., a two-dimensional model or a three-dimensional model) of the subsurface that in addition to static properties, such as porosity and permeability, also has dynamic properties that vary over the timescale of resource extraction, such as fluid composition, pressure, and relative permeability.

As used herein, a "geomechanical model" is a model (e.g., a two-dimensional model or a three-dimensional model) of the subsurface that contain properties, such as static properties and may model responses to changes in stress, such as mechanical response. The static properties may include properties, such as rock compressibility and Poisson's ratio, while the mechanical response may include compaction, subsidence, surface heaving, faulting, and seismic events, which may be a response to fluid injection and extraction from the subsurface region.

As used herein, "structural framework" or "framework" refer to a subsurface representation formed from objects (e.g., faults, horizons, other surfaces and model boundaries). For example, the framework is a subsurface representation that contains surfaces and polylines. A framework may be formed by surfaces of geologic, engineering, planning, or other technical relevance.

As used herein, "zone", "region", "container", or "compartment" is a defined space, area, or volume contained in the framework or model, which may be bounded by one or more objects or a polygon encompassing an area or volume of interest. The volume may include similar properties.

As used herein, "mesh" or "grid" is a representation of a region of space (e.g., 2-D domain or 3-D domain), which includes nodes that may form mesh elements, such as polygons or polyhedra, disposed within the region (e.g., a volumetric representation). The mesh may represent surfaces, horizons, faults, and/or other objects by a set of nodes, which may include various mesh elements in the form of polygons or polyhedra, disposed within the region. Properties may be assigned to or associated with the mesh elements.

As used herein, "simulate" or "simulation" is the process of performing one or more operations using a subsurface model and any associated properties to create simulation results. For example, a simulation may involve computing a prediction related to the resource extraction based on a reservoir model. A reservoir simulation may involve performing by execution of a reservoir-simulator computer program on a processor, which computes composition, pressure, and/or movement of fluid as a function of time and space for a specified scenario of injection and production wells by solving a set of reservoir fluid flow equations. A geomechanical simulation may involve performing by execution of a geomechanical simulator computer program on a processor, which computes displacement, strain, stress, shear slip, and/or energy release of the rock as a function of time and space in response to fluid extraction and injection.

As used herein, the term "fracture" refers to any local separation or a discontinuity plane in a geological formation. A fracture may be a fault/shear (Mode II and/or Mode III) fracture or joint/opening (Mode I) fracture. The term "joint" or Mode-I fracture" refers to a fracture in rock where there has been no or insignificant lateral movement in the plane of the fracture (e.g., up, down, or sideways) of one side relative to the other. See e.g., Klerck et al. (2004), "Discrete fracture in quasi-brittle materials under compressive and tensile stress states", *Methods in Applied Mechanics and Engineering*, Vol. 193, pp. 3035-3056. Thus, a joint or Mode-1 fracture is different from a fault or shear fracture (Mode II or Mode III) which is defined as a fracture in rock where one side slides laterally past to the other.

As used herein, the term "natural fracture" refers to any fracture in subsurface that is not produced by human activities such as drilling, incidental or intentional hydro-fracturing, core handling, etc. The term "natural fractures" is used to distinguish fractures that form due to geological causes, such as tectonic loading (e.g. regional compression/extension), folding, faulting, slip on pre-existing surfaces, pore pressures, erosion/unloading, material heterogeneity, and heating or cooling of joints.

As used herein "damage" refers to a zone of intensely deformed and/or fragmented rock. This zone can accommodate intense slip, opening or fragmentation. Damage can either be localized in a relatively narrow band or it may involve large material regions that fail and fragment simultaneously.

As used herein "mode of fracture origin" refers to the mode (e.g. Mode-I, Mode-II, or Mode III) by which fracture initiation occurred. For example, a fracture that initiated as Mode I can later close and accommodate slip along the fracture faces as in Mode II; however the mode of origin of the fracture remains Mode-I.

As used herein "forward mechanical models" include FEM-DEM, DEM, and/or continuum analysis where rock layers are deformed from an initial position to a final geometry.

As used herein, "DEM" refers to Discrete Element Methods, which are numerical methods for computing the motion of large numbers of particles or elements, which represent a subsurface region herein.

As used herein, "FEM" refers to Finite Element Methods, which are numerical techniques for solving engineering problems by dividing a region into smaller mesh elements such that the combined properties of the smaller mesh elements contain the properties of the region.

As used herein the term "restoration analysis" refers to unfolding, unfaulting, and re-ordering (e.g., translations and rotations) of deformed rocks back to an initial, primary depositional geometry.

As used herein the term "marcomechanical geological load" refers to stresses and displacements for a large or regional scale, which represent the stresses and/or displacements for a larger region than the region being modeled. By way of example, a zone may be defined by a volume A, the macromechanical geologic loading represents the stresses and/or displacements associated with a volume B, where volume B is larger than the defined volume A and may contain volume A. These loads may represent stresses and/or displacements for a defined region, which are based on a global model that represents the tectonics of the region, geomechanical modeling, burial history, in-situ stress measurements, geologic interpretations of stress changes over time, which may be based on geological reconstructions and/or a global model that represents the tectonics of region, and/or any combination thereof.

In hydrocarbon operations, a subsurface model is created in the physical space or domain to represent the subsurface region. The subsurface model is a computerized representation of a subsurface region based on geophysical and geological observations made on and below the surface of the Earth. The subsurface model may be a numerical equivalent of a geological map (e.g., two-dimensional geological map or three-dimensional geological map) complemented by a description of physical quantities in the domain of interest. The subsurface model may include multiple dimensions and is delineated by objects, such as horizons, fractures, and faults. The subsurface model may include a structural framework of objects, such as faults, fractures, and horizons, and may include a mesh or grid of nodes to divide the structural framework and/or subsurface model into cells, which may include mesh elements or blocks in two-dimensions, mesh elements or voxels in three-dimensions, or other suitable mesh elements in other dimensions. A cell, such as block, mesh element, or voxel, is a subvolume of the space, which may be constructed from nodes within the mesh. In the subsurface model, material properties, such as rock properties (e.g., permeability and/or porosity), may be represented as continuous volumes or unfaulted volumes in the design space, while the physical space may be represented as discontinuous volumes or faulted volumes (e.g., contain volume discontinuities, such as post-depositional faults).

Within the subsurface models, a grid or mesh may be used to partition the model into different subvolumes, which may be used in hydrocarbon operations, such as reservoir simulation studies in hydrocarbon exploration, development, and/or production operations, as well as for representing a subsurface model description of a reservoir structure and material properties. Accordingly, the mesh may be configured to form cells that may represent material properties, such as rock and fluid properties, of a reservoir or may be used for numerical discretization of partial differential equations, such as fluid flow or wave propagation.

In the subsurface regions represented by the subsurface model, various fractures and other structures may be present. For example, natural fractures may be present and relied upon to economically produce hydrocarbons from a subsurface region. Also, natural fractures may be utilized to optimize the production of hydrocarbons from the subsurface. However, natural fractures may also present certain problems, such as providing passages that lose drilling fluid and passages that lessen the effectiveness of sweeps in injection operations. Accordingly, modeling natural fractures present in a subsurface region may enhance the hydrocarbon operations associated with that subsurface region, which may include asset acquisition evaluation, selection of drill site and completion zones, and/or injection planning.

Natural fractures may form under a combination of macromechanically driven loading conditions, such as elevated pore pressures, folding of geological strata, vertical loading of heterogeneous stacked layers, slip along preexisting faults, and others. Although the existence of microflaws may play a role in fracture initiation and propagation, macromechanically driven factors dominate the resulting natural fracture patterns. Natural fractures may occur in varying orientations, occur in clusters, have different propagating lengths, and have various apertures. Accordingly, fracture prediction has to characterize such properties.

Because natural fractures may affect the movement, storage, and recovery of hydrocarbons, predicting the characteristics of the natural fractures in the subsurface region is beneficial. Example fracture characteristics may include the density, height, length, aperture, orientation, timing and abutting relationships, and/or geometry. These fracture characteristic may be used to determine the connectivity between fractures. The fracture characterization may include analyzing log and core data, and reviewing seismic attributes, such as the azimuthal variation of P-wave velocities or amplitude versus offset. Further, as noted above, 2-D restoration, 3-D restoration, and curvature analyses have limited ability in fracture prediction. For example, curvature analysis does not represent the entire macromechanical geological or deformation process. Natural fractures may be developed at a point in history when the deformation is significantly different from that which the curvature analysis may represent. This is further compounded by the difficulties in qualitatively correlating the curvatures with fracture density and interaction.

The present techniques provide enhancements in the generation of subsurface models. Accordingly, the present techniques enhance subsurface models by characterizing natural fractures using a physics-based numerical method to simulate the genesis of natural fractures. In such approach, physical laws such as conservation of linear momentum, material constitutive relationships, and fracture growth laws are utilized in the simulation which results in a prediction of fracture initiation, re-orientation, and intersection due to macromechanical geological processes. To manage subsurface uncertainties, the numerical methods may be combined with estimations of input probabilities and data observation to render a probabilistic description of natural fracture characterization.

By way of example, the numerical method may involve various steps. Within a subsurface model, a zone where the fracture characterization is to be performed is identified. Then, a multi-layer model is created for the identified zone. The creation of the multi-layer model may involve meshing the multi-layer model and specifying mechanical rock properties for each element in the mesh. Then, loads that reflect macromechanical geological processes may be applied to the multi-layer model. Once the loads are applied, a simulation (e.g., a physics based simulation) may be performed to simulate the genesis of natural fractures, which, for example, may involve various time steps in a set period of time. Once the multi-layer model is simulated, simulation results may be output. The simulation results may include the multi-layer model at the various time steps and/or data generated at the various time steps, such as fracture geometry, aperture, connectedness, or effective permeability. The results may include fracture characterization, which may include fracture generation, fracture interaction, fracture intersection, and any combination thereof. The results are gathered, processed, and may be used in fracture characterization workflows for further analysis.

In certain configurations of the present techniques, the creation of the multi-layer model may involve various steps. By way of example, the multi-layer model creation may comprise the following steps of (i) defining a zone for numerical evaluation; (ii) separating the multi-layer model into one or more stratigraphic layers; (iii) constructing a mesh for the modeled domain (e.g., identified zone); and (iv) assigning material constitutive relationships for each of the stratigraphic layers in the multi-layer model. The simulation may be used to capture how stresses change in the identified zone in response to the deformation from the macromechanical geological loads.

In certain configurations, the simulation may include numerical simulation. In such simulations, the marcomechanical geological loading is discretized into a number of loading steps, which involves iteratively solving the conservation of linear momentum equations and updating the fracture trajectories until none of the mesh elements breach or exceed the fracture initiation or propagation criteria. Determining whether a mesh element exceeds the fracture initiation or propagation criteria may include determining whether an estimated stress (e.g., from solving the conservation of linear momentum equations) is above a critical stress, minimizing the potential energy of the mesh elements, or other suitable fracture initiation and propagation laws. For example, if the stress exceeds a threshold, the mesh element breaks to form a fracture. By way of example, the simulation may include solving the conservation of linear momentum equation using interpolation and enrichment methods to compute information (e.g. stress) used to evaluate where the subsurface (e.g., rock) may fracture based on the fracture initiation and propagation laws, as described herein. The simulation may further comprise checking to determine if any mesh elements should to be identified as having fractures. For each mesh element or cluster of mesh elements that exceed the fracture initiation or propagation criterion, selecting at least one mesh element based on a selection criterion (e.g., mesh element that exceed the criterion by the largest amount) as the mesh element to fracture, determining a fracture surface direction in the mesh element(s) to be fractured based on the chosen law for fracture growth direction (e.g., by determining the minimal principal stress and having the fracture growth direction be the direction that is perpendicular to the minimal principal stress), and fracturing the identified mesh elements. The method may then be iteratively repeated to determine if changes in the fractured mesh elements have caused other mesh elements to exceed the fracture initiation and propagation criteria for the current loading step. Once no mesh elements exceed the fracture initiation and propagation criteria for the current loading step, the method may be repeated for additional loading and/or time steps.

In certain configurations, the method may further comprise solving one or more equations (e.g., stress equations). For example, a numerical simulation may be performed to capture the genesis of natural fractures. This may involve formulating and solving conservation of linear momentum equations. The conservation of linear momentum equations may include rock density, total stress, initial rock stress, effective stress applied on the rock skeleton, Biot's constant, identity second order tensor, thermal stress, pore pressure history, and any combinations thereof. The stresses, with the exception of the effective stress, may be estimated from burial history or a basin model, and may serve as inputs to the simulation (e.g., may be used as loads for the multilayered model). The effective stress is a function of rock deformation which is further dependent on the displacement solution (or unknowns) of the numerical simulation.

To solve the governing equation (e.g., conservation of linear momentum equation) using the Finite Element Method, Galerkin formulation may be used, which includes weight functions, jump operators, traction applied on the fractured surface and/or applied as a function of fracture opening, and combinations thereof. See, e.g., Thomas J. R. Hughes, The Finite Element Method, p. 1 to 676 (1987) ISBN-13: 978-0486411811.

To enhance the process, enrichment functions may be utilized to capture the discontinuity in the displacements. Accordingly, the simulation results may be interpolated, which may involve the use of the enrichment functions, which depend on shape functions defined at each node. Each enrichment function may be associated with individual node and may contribute to the interpolation of the displacement inside the fractured mesh element. While one term may be configured to provide sufficiently accurate solution (e.g., converge within a specific threshold during mesh refinement) for continuous and smooth displacement field, other terms may be added to enhance or improve the interpolation of the discontinuity in the displacement field.

Accordingly, the present techniques may enhance the generation of subsurface models. For example, in one or more embodiments, a method for generating a subsurface model for a subsurface region is described. The method comprises: obtaining a subsurface model associated with a subsurface region; identifying a zone in the subsurface model for fracture characterization; creating a multi-layer model for the selected zone; applying macromechanical geological loads to the multi-layer model; simulating the multi-layer model based on the loads; and outputting fracture characterization results from the simulation for the multi-layer model of the selected zone.

In certain embodiments, the method may include certain enhancements. For example, creating the multi-layer model may include: (i) defining or identifying the zone for numerical evaluation (e.g., define shape to define the area to be evaluated and range of depth or defining a polygon for the volume to be evaluated); (ii) separating the multi-layer model into one or more stratigraphic layers; (iii) constructing a mesh for the zone; and (iv) assigning material constitutive relationships for each of the stratigraphic layers. The method may further comprise applying macromechanical geological loads that represent macromechanical geological processes to the multi-layer model.

In one or more embodiments, simulating the multi-layer model based on the macromechanical geological loads may include performing a plurality of loading steps, wherein each loading step comprises: (i) solving one or more conservation of linear momentum equations associated with the zone, which may involve using an enhanced interpolation and enrichment method to compute information (e.g. stress) used to evaluate where the rock may be fractured based on the fracture initiation and propagation law; (ii) determining if the solution for any mesh elements in the multi-layer model exceed a fracture initiation or propagation criterion; (iii) if the solution for any of the mesh elements does not exceed the fracture initiation or propagation criterion, continuing to step (v); (iv) if the solution of any one of the mesh elements exceed the fracture initiation or propagation criterion, (a) selecting the mesh element associated with the solution that exceeds the fracture initiation or propagation criterion by the largest absolute value as the mesh element to fracture (e.g., which may include selecting one or more mesh elements); (b) determining fracture surface direction in the mesh element to be fractured based on fracture growth direction criteria; (c) calculating one or more level set values based on the fracture surface direction; (d) determining sub-regions for the mesh element based on the one or more level set values (e.g., the extension of fracture surface into the mesh elements may be achieved by solving level set function (e8) and (e9)); and (e) repeating to step (i) using the determined sub-regions to represent the mesh element; and (v) storing the fracture characterization results for the loading step. Also, if this is not the last loading step, the load is incremented and the process repeats for the next loading step. However, if this is the last loading step, the simulation is completed. The method may further include identifying the zone for fracture characterization based on locations associated with subsurface locations having measured data, wherein the measured data may comprise core sample data, image logs, mini fracture test data, drill stem test data, and any combination thereof. The method may further comprise performing a hydrocarbon operation based on the results of the simulation, such as the fracture characterization results.

In other configurations, additional enhancements may be performed. For example, the mesh elements that have a solution that exceeds the fracture initiation or propagation criterion may be grouped or clustered to perform the steps of a) to e) for each of the respective clusters. The identification of the clusters may be performed after the solution has been calculated for the mesh elements and prior to determining if the solution for the conservation of linear momentum equations of the mesh elements exceed the fracture initiation or propagation criterion. Then, each of the clusters may perform the steps a) to e) in parallel or concurrently to lessen the computational time.

Further, the solving of conservation of linear momentum equation may comprise solving the expression: $\nabla \cdot \sigma + \rho g = 0$, where g is gravity, $\rho$ is rock density and $\sigma$ is total stress. The conservation of linear momentum equation may also include an enrichment term to capture discontinuities associated with displacements in the zone; and thus, solving of conservation of linear momentum equation may further comprise solving the expression:

$$u^h(x) = \sum_{i=1}^{N^e} N_i(x) u_i + \sum_{k=1}^{Nf} \sum_{i=1}^{N^e} N_i(x) a_i^k (H_k(x) - H_k(x_i)) D_k(x)$$

where $u^h$ is interpolation of displacement, k is the fracture, $H_k$ is the jump function for the fracture k, $D_k$ is a domain function for the fracture k, $N^e$ is number of nodes in the mesh element, i is the node, x is the location, $x_i$ is location of $i^{th}$ node, $u_i$ is displacement of the node i, $N^f$ is number of fractures, $a_i$ is enrichment unknown of the node i, and $N_i$ is the shape function of the node i.

Beneficially, the present techniques provide various enhancements to the hydrocarbon extraction process. A subsurface model may be generated that includes fracture characterizations with less computational effort, with less intervention and in a shorter time to provide a mechanism for the generation of more realistic subsurface models, simulation results and analysis of more complex subsurface structures associated with subsurface models, and to provide enhancements to the quantification of risks and uncertainties of the assessment of the productivity potential of the subsurface region. The present techniques may be further understood with reference to FIGS. 1 to 8, which are described further below.

FIG. 1 is an exemplary flow chart 100 in accordance with an embodiment of the present techniques. The flow chart 100 includes a method for characterizing fractures in a subsurface region and using the fracture characterization in subsurface models for hydrocarbon operations. The method may include obtaining data and creating a subsurface model, as shown in blocks 102 to 104. Then, one or more zones of the subsurface model are identified and simulated to form fractures in a multi-layer model, as shown in blocks 106 to 116, and using the fracture characterization results in the subsurface model to perform simulations and for hydrocarbon operations, as shown in blocks 118 and 120.

To begin, the method involves obtaining data and creating a subsurface model for the subsurface region, as shown in blocks 102 to 104. At block 102, data is obtained for the subsurface region. The data may be input from a user or accessed from memory. The data may include seismic data, well log data, core sample data, image logs, mini fracture test data, drill stem test data, and combinations thereof. By way of example, the data may include fault and/or horizon geometry data, which may be determined from seismic data. Then, a subsurface model is obtained for the subsurface region, as shown in block 104. The subsurface model may be obtained from memory or created from a portion of the obtained data. The subsurface model may include geologic features, such as horizons and faults. By way of example, the creation of the subsurface model may include forming a structural framework of objects (e.g., surfaces, such as faults, horizons, and if necessary, additional surfaces that bound the area of interest for the model), verifying or forming the objects into closed volumes, meshing or partitioning the volume into sub-volumes (e.g., cells, mesh elements or voxels) defined by a mesh (e.g., a 3-D mesh or 3-D grid), and assigning properties to the mesh elements. The properties may include transmissibility, rock type, porosity, permeability, rock compressibility, or oil saturation.

Once the subsurface model is obtained, one or more zones are identified and simulated to form fractures in respective multi-layer models, as shown in blocks 106 to 116. In block 106, a zone is identified in the subsurface model for fracture characterization. The zone may be identified as a region or location where data observations are available for model calibration (e.g., core sample locations, image log locations, mini fracture test locations, and/or drill stem test locations), highlighting a region of the subsurface model and/or a potential drill site where a fracture characterization may be useful. The observed data may represent a portion of the region (e.g., may be localized) at specific locations, such as a specific depth or range of depths. Highlighting a region of the subsurface model may include identifying a region based on uncertainty data, selection of points with a region identified from one point, and/or drawing a shape, which is then associated with the mesh elements. Then, a multi-layer model is created for the identified zone, as shown in block 108. The creation of the multi-layer model may include obtaining the grid or mesh for the identified zone; obtaining data for the zone, such as well log data for the zone; obtaining a conceptual model for the identified zone; and creating a generic model from the data. Once the multi-layer model is created, the properties may be populated into the mesh elements from associated data. While the multi-layer model may be coupled to the subsurface model or a portion of the subsurface model, the multi-layer model may be simulated and modeled independent of the subsurface model.

Once the multi-layer model is created, macromechanical geological loads are determined to be applied to the multi-layer model to represent macromechanical geologic processes, as shown in block 110. The macromechanical geological loads may be determined from a user, geomechanical modeling, burial history, in-situ stress measurements, and/or geologic interpretations of stress changes over time, which may be based on geological reconstructions and/or a global model that represents the tectonics of region. The macromechanical geological loads may be represented by force and/or force over area or volume and include units such as mega-Pascal (MPa), for example. At block 112, a simulation is performed with the multi-layer model and the applied macromechanical geological loads. The simulation may be performed for various time steps in a defined period of time to simulate the macromechanical geologic processes. The simulation may be used to model or represent fracture generation, fracture interaction and/or fracture intersection, which may be based on calculating the solutions to equations (e1) to (e6), as noted below. As may be appreciated, loading increments may vary for different loading steps. For example, fine scale increments may be utilized, but may involve more iterations and provide a result that is more accurate. Coarse scale increments may lessen computation time and lessen the number of iterations, but may not provide results that are as accurate as the fine scale increments. Accordingly, the application of the macromechanical geological loads may involve performing the loading operations in various steps or operations, which may be adjusted between steps. By way of example, the initial steps may include performing coarse loading steps that may adjust the load by coarse scale increments that are larger than the fine scale increments in the fine loading steps. The fine scale increments may adjust the load by a fraction of coarse scale increments, such as half or less, as compared with the coarse scale increments. For instance, the coarse loading may include fifty MPa of stress that may be applied in increments of ten MPa, while the fine loading steps may include using increments of five MPa or less. The adjustment to the loading increment may be based on one of the fracture characterization results, such as fracture density, orientation, aperture, and/or spacing. For example, if the fracture characterization increases at a rate less than 10% between loading steps (e.g., fracture density increases at a rate less than 10%), the fine loading step may be used for the next loading step. Otherwise, the coarse loading step may be used for a simulation that takes less time. In other configurations, the adjustment may be based on characterizations being less than 20% of the threshold or less than 5% of the threshold, or other suitable user defined threshold. Preferably, the loading steps may be configured to be the same for each comparison.

Then, a determination is made whether any additional zones are to be simulated, as shown in block 114. If one or more additional zones are to be simulated, the process repeats to block 106 to identify another zone. However, if no additional zones are to be simulated, the process outputs the fracture characterization results, as shown in block 116. The outputting of the fracture characterization results may include displaying the fracture characterization results, storing the fracture characterization results in memory, and/or adjusting the subsurface model to incorporate the fracture characterization results. As may be appreciated, the fracture characterization results may be integrated into a reservoir simulation, as noted below, or may be used independently for hydrocarbon operations.

Once the fracture characterizations are complete, the fracture characterization results may be used to perform simulations and for hydrocarbon operations, as shown in blocks 118 and 120. At block 118, a simulation may optionally be performed based on the fracture characterization results. The simulation may be performed with the subsurface model, which may have the fracture characterization results incorporated into the respective zones of the subsurface models. The subsurface model may be a reservoir model, geomechanical model, or a geologic model and may be utilized to provide simulation results. Performing the simulation may include modeling fluid flow based on the reservoir model and the associated properties stored within the cells of the reservoir model. The simulation results may include the computation of time-varying fluid pressure and fluid compositions (e.g., oil, water, and gas saturation) and the prediction of fluid volumes produced or injected at wells. Performing the simulation may also include modeling structural changes based on the geologic model and the associated properties stored within the cells of the geologic model. The simulation results, which may include the model being simulated at each time step or the generated data at each time step, may be outputted. The outputting of the simulation results may include displaying the simulation results on a monitor and/or storing the simulation results in memory of a computer system. At block 120, the fracture characterization results and/or simulation results may be utilized to perform hydrocarbon operations. The hydrocarbon operations may include hydrocarbon exploration operations, hydrocarbon development operations, and/or hydrocarbon production operations. For example, the simulation results, the geologic model, and/or the reservoir model may be used to estimate or adjust reserves forecasts, reserves estimations, and/or well performance prediction. As another example, the simulation results, the geologic model, and/or the reservoir model may be used to adjust hydrocarbon production operations, such as installing or modifying a well or completion, modifying or adjusting drilling operations, decreasing or increasing penetration into natural fractures, and/or installing or modifying a production facility. Further, the fracture characterization results and/or simulation results may be utilized to predict hydrocarbon accumulation within the subsurface region; provide an estimated recovery factor; input into other simulations; estimate rock compressibility; determine effective mechanical properties of rock; determine rates of fluid flow and/or evaluation of top seal capacity for a subsurface region. The production facility may include one or more units to process and manage the flow of production fluids, such as hydrocarbons and/or water, from the formation.

Beneficially, this method provides an enhancement in the production, development, and/or exploration of hydrocarbons. In particular, the method may be utilized to enhance development of subsurface models that properly characterize fractures. This additional fracture characterization may lessen uncertainty in the subsurface model and hydrocarbon operations. For example, the fracture characterization may provide an enhanced estimate of the potential reservoir productivity. Further, the fracture characterization may provide an enhanced subsurface model with less computational effort, less interactive intervention, and/or in a computationally efficient manner. As a result, this may provide enhancements to production at lower costs and lower risk.

As may be appreciated, the blocks of FIG. 1 may be omitted, repeated, performed in a different order, or augmented with additional steps not shown. Some steps may be performed sequentially, while others may be executed simultaneously or concurrently in parallel. For example, in certain embodiments, the method may include performing blocks 106 to 112 concurrently or simultaneously for two of more identified zones. The identified zones may be modeled at different scales and/or different volumes or at the same scale (e.g., each of the scales for the zone may be independent of the other zones). Further, in other configurations, the determination of the macromechanical geologic loads and the simulation of the multi-layer model with the applied loads in blocks 110 and 112 may adjusted to represent one or more modes of failure, such as fracture may be a fault/shear (Mode II and/or Mode III) fracture or joint and/or opening (Mode I) fracture. The Mode I is described further below with reference to equations (e1) to (e6). In addition, the present techniques may also be used to model Mode II and Mode III, which may include solving different equations.

In certain configurations of the present techniques, the creation of the multi-layer model may involve various steps. By way of example, the multi-layer model preparation may comprise the following steps. As a first step in creation of the multi-layer model, a zone is defined for numerical evaluation. The size of the zone may be determined by the user or within a range of measured data. It may be based on regions for hydrocarbon recovery and may be identified by defining a boundary polygon or mathematically defined region around a point. For example, the modeling of the genesis of natural fractures in a zone or reservoir may not be computationally practical or even necessary. This is because fractures separated by larger distances do not communicate with each other. As a result, these fractures may be ignored as the stresses do not meaningfully impact (e.g., are negligible) the respective calculation results. Accordingly, the locations of the zones that are defined for numerical evaluation may be locations where data observations are available for model calibration and/or zones that include a potential drill site where a characterization may be useful. Examples of data observation include core sample data, image logs, mini fracture test data, and/or drill stem test data. The data may be localized and may not be associated with larger volumes within the subsurface region.

Figure 2:
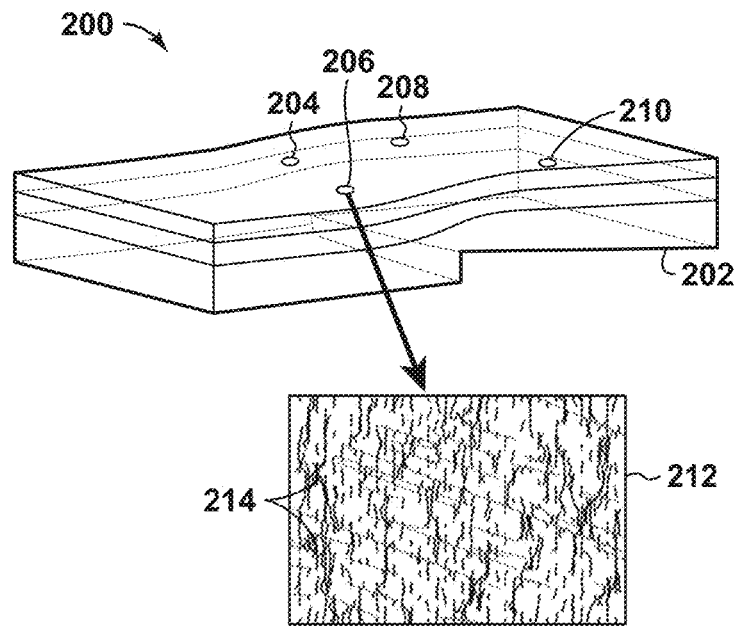
FIG. 2 is an exemplary diagram associated with simulating the fracture characterization for four zones in a subsurface model in accordance with an embodiment of the present techniques.

FIG. 2 is an exemplary diagram 200 associated with simulating the fracture characterization for four zones 204, 206, 208, and 210 in a subsurface model 202 in accordance with embodiments of the present techniques. In this diagram 200, the fracture characterization is conducted in four zones 204, 206, 208, and 210 of the subsurface model 202 where folding is being represented. For each of the selected zones 204, 206, 208, and 210 a multi-layer model may be created and simulated for fracture characterization prediction. The fracture characterization prediction 212 for zone 206 is shown as having various fractures, such as fractures 214.

In a second step of creating the multi-layer model, the multi-layer model may be separated into one or more stratigraphic layers. These layers may be separated based on mechanical properties or the interface between layers. Each layer may have constant or continuously changing material properties. The stratification may be performed based on well log data or other observed or measured data and/or stratigraphic concepts.

In a third step of creating the multi-layer model, a mesh may be constructed for the selected zone. The mesh may or may not honor or be constrained to the layer interfaces. If the mesh does not honor the layer interfaces, the techniques, such as those described in U.S. Pat. No. 8,190,414, which is incorporated herein by reference, may be used to treat the intersection of mesh element and layer boundaries.

In a fourth step of creating the multi-layer model, material constitutive relationships may be assigned for each layer in the model to capture how stresses change in response to the deformation. Constitutive relationships define how material response once a load is applied, or relates the deformation versus load, as is known to those skilled in the art. Examples of such constitutive relationships may include linear elastic models or Cam Clay models. These models may include parameters, such as Young's Modulus and Poisson's ratio. For example, linear elastic models involve Young's Modulus and Poisson's ratio. Such parameters can be measured from core sample tests, derived from logs, or estimated from analog formations. The parameters may also be calibrated using observed data.

In addition, a fracture criterion may also be specified for each layer of the multi-layer model. The fracture criterion may control the conditions under which a fracture may be initiated and the direction that the fracture may propagate. An example of fracture initiation may be Rankin criterion in which a critical tensile stress is defined and the fracture may be initiated if the computed stress exceeds the critical stress. An example of the fracture propagation direction law, which may be represented as a fracture propagation direction equation or expression, is that opening mode fractures open perpendicular to the minimal principal stress direction. Another example is to extend a fracture in the direction that can minimize the potential energy. See, e.g., Blaise Bourdin, Gilles A. Francfort, Jean-Jacques Mango, *The Variational Approach to Fracture*, Journal of Elasticity, 91:p. 5 to 148 (2008).

After the multi-layer model is created, loads that represent macromechanical geological processes may be applied to the multi-layer model. If a basin or region scale deformation history is known, such as when a forward or structural restoration model is available, the strain information at the zone of interest may be extracted from the larger scale deformation map, and then used to apply the appropriate boundary conditions to the multi-layer model for the selected zone of interest. Otherwise, traction boundary conditions may be applied using burial history as a mechanism to apply the overburden stress. Other stresses may be applied using some assumption on the ratio between the overburden and horizontal stresses. Additionally, information from burial history, pore pressure history, and thermal history may be obtained from a user, memory, or other modeling associated with the subsurface region.

To perform the simulation with the multi-layer model, various simulation procedures may be performed. The simulation may grow or interact fractures to comply with physics laws to manage the maximum and minimum potential energy. Further, the simulation may be completed if the stress of the rock is below the critical stress defined by the fracture propagation criteria; the loading steps are completed; growing fractures until the potential energy of the model is minimized; and/or performing a specific number of iterations. Further, the loads may be applied incrementally to equilibrate the rock. For example, in the numerical simulation, the macromechanical geologic loading may be discretized into a number of loading operations or steps. Within each operation, the conservation of linear momentum equation is iteratively solved and the fracture trajectories are updated until no mesh element or cell exceeds the fracture initiation or propagation conditions. As a specific example, the procedure within a loading step may include the following: (i) solving the conservation of momentum equation (e.g., using an interpolation and enrichment method for the displacement), which is described below in the solving the conservation of linear momentum equations operations along with in the discussion of equations (e1) to (e6); (ii) verifying whether any mesh elements should be fractured (e.g., based on calculated values compared to certain thresholds), if no such mesh element need to be fractures, proceed to step (vii); (iii) for each cluster of mesh elements that exceed the fracture initiation or propagation criterion, select the mesh element that exceed the criterion by the largest amount as the mesh element to fracture; (iv) determine fracture surface direction in mesh elements to be fractured based on the predetermined fracture criteria or equations for fracture growth direction; (v) fracture the identified cells; (vi) then, repeat back to step (i); and (vii) complete the current loading step.

As yet another configuration, the calculations of the fractures may be adjusted to represent one or more modes of failure, such as fracture may be a fault/shear (Mode II and/or Mode III) fracture or joint and/or opening (Mode I) fracture. The Mode I is described further below with reference to equations (e1) to (e6), but Mode II and/or Mode III may also be utilized in other configurations based on solving different equations.

As part of the simulation, a solve stress equation operation may be performed. For example, a numerical simulation may be performed to capture the genesis of natural fractures in the subsurface region of interest. In general, the numerical formation seeks to solve the conservation of linear momentum equation (e.g., stress balance equation) (e1), $$\nabla \cdot \sigma + \rho g = 0 \quad (e1)$$

where g is gravity, $\rho$ is rock density, and $\sigma$ is the total stress. The latter may further be decomposed into equation (e2), $$\sigma = \sigma^{init} + \sigma' - \alpha p I + \sigma^T \quad (e2)$$

where $\sigma^{init}$ is the initial rock stress, $\sigma'$ is the effective stress applied on the rock skeleton, $\alpha$ is Biot's constant, I is the identity second order tensor, $\rho$ is pore pressure and $\sigma^T$ is the thermal stress. All stresses, except the effective stress, may be estimated from burial history or a basin model or a geomechanical simulation, and may serve as input data to the numerical evaluation. The effective stress is a function of rock deformation, which is further dependent on the displacement solution (or unknowns) of numerical methods.

To solve the governing equation using the Finite Element Method, a standard Galerkin formulation may be applied to the governing equation (e1), which results in the following integration form of the governing equation (e3), $$\int_\Omega \nabla w \sigma' d\Omega + \sum_{i=1}^{N_f} \int_{\Gamma_i^D} [\![w]\!] t d\Gamma = -\int_\Omega \nabla w(\sigma^{init} - \alpha p I + \sigma^T) d\Omega + \int_{\Gamma^H} w h d\Gamma \quad (e3)$$

where w is the weight functions, $[\cdot]$ is the jump operator, t is the traction applied on the fractured surface and is a function of fracture opening, which in turn depends on the rock deformation to be sought, h is the surface traction, and $\Gamma^H$ is the surface where the surface traction is applied. In equation (e3), all terms on the left hand side depend on displacement unknowns, and terms on the right hand side may be computed from inputs. In other configurations, a force balance equation may be solved for the fractures.

To solve equation (e3), one needs to evaluate each integration term element by element. In each element, the weight functions and the solution a are interpolated from their values at nodes. Inserting the interpolation of solution w and solution u into the equation (e3) results in a matrix equation in the form of Au=b, where A is a matrix (also known as the stiffness matrix), b is a vector computed from the right hand side of equation (e3), and u contains all the displacement unknowns at each node. By solving this matrix equation, the solution of the displacement unknown is obtained. If nonlinear relationships are present in the constitutive relationship or traction condition, an iterative process may be performed to provide the solution converge to a final solution which satisfy equation (e3) numerically.

Further, the present techniques provide an enhanced mechanism to interpolate the solution u. Shape functions may be used to interpolate solution u, which are smooth and continuous, but cannot approximate discontinuity well. For example, Belytschko et al. describe a jump function to captured displacement discontinuity for a single fracture. See, e.g., T. Belytschko and T. Black, "Elastic crack growth in finite elements with minimal remeshing," International Journal for Numerical Methods in Engineering, 45 (5): p. 601 to 620 (1999). The equation (e4) is as follows:

$$u^h(x) = \sum_{i=1}^{N^e} N_i(x)u_i + \sum_{i=1}^{N^e} N_i(x)a_i(H(x) - H(x_i)) \quad (e4)$$

where $N^e$ is the number of nodes in a mesh element, x is the location, $N_i$ is the shape function of the node i, and $u_i$ is the displacement of the node i. The first summation term of equation (e4) is the same as regular FEM interpolation. This term is capable of providing sufficiently accurate solution for continuous and smooth displacement field. The second summation term of equation (e4) is added to enhance the interpolation of the discontinuity in the displacement field (e.g., an enrichment term). The approximation is achieved by employing the enriched degree of freedoms denoted as enriched degree of freedoms $a_i$ and the enrichment function H(x), which is a jump function defined as follows:

$$H(x) = \begin{cases} -1, & x \in \Omega^{e-} \\ 1, & x \in \Omega^{e+} \end{cases} \quad (e5)$$

where $\Omega^{e-}$ and $\Omega^{e+}$ are the positive and negative portion of a mesh element that is cut by a fracture, respectively. Inserting equation (e4) into standard continuous Galerkin form equation (e3) results in a matrix equation with unknowns of not only displacement of the node $u_i$, but also enriched degree of freedoms $a_i$. The enriched degree of freedoms $a_i$ gauges the magnitude of the involvement of the enrichment function H(x) in the displacement field.

In operations when a mesh element is cut by a multitude of fractures with possible intersection, the following formula to interpolate the displacement is as follows in equation (e6):

$$u^h(x) = \sum_{i=1}^{N^e} N_i(x)u_i + \sum_{k=1}^{N^f} \sum_{i=1}^{N^e} N_i(x)a_i^k (H_k(x) - H_k(x_i))D_k(x) \quad (e6)$$

where $u^h$ is interpolation of displacement, k is the fracture, $H_k$ is the jump function for the fracture k, $D_k$ is a domain function for the fracture k, $N^e$ is number of nodes in the mesh element, i is the node, x is the location, $x_i$ is location of $i^{th}$ node, $u_i$ is displacement of the node i, $N^f$ is number of fractures, $a_i$ is enrichment unknown of the node i, and $N_i$ is the shape function of the node i. It is noted that when a first fracture is truncated by another fracture, such as a second fracture, the jump function of the first fracture may extend beyond the second fracture, even though the jump function may have no influence there. To suppress the influence of a jump function $H_k$ for the fracture k in subdomains where it should have no influence, the domain function $D_k$ for the fracture k is utilized, which is unity in the sub-element partitions attached to the fracture k, and vanishes elsewhere. This equation is capable of addressing multiple fractures.

Figure 3:
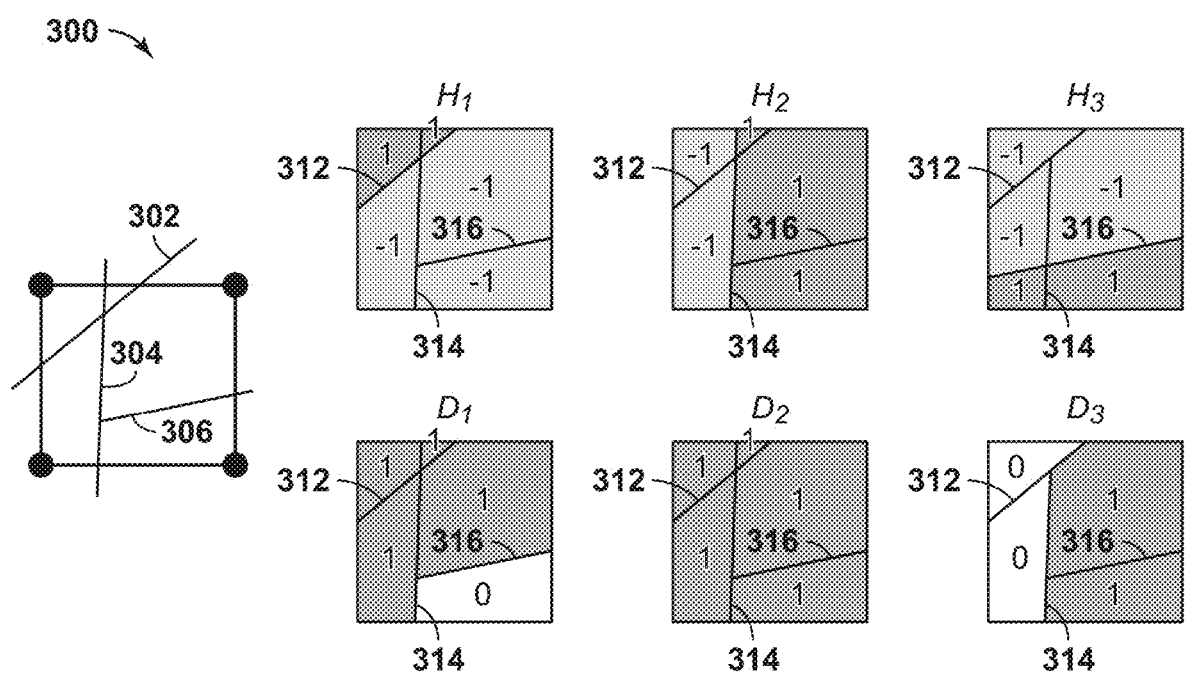
FIG. 3 is a diagram associated with use of a jump function and domain function for three intersecting fractures in accordance with an embodiment of the present techniques.

By way of example, FIG. 3 is a diagram 300 associated with use of a jump function and domain function for three intersecting fractures 302, 304, and 306 in accordance with embodiments of the present techniques. In this diagram 300, the jump function $H_1$ is associated with the fracture 302, the jump function $H_2$ is associated with the fracture 304, and jump function $H_3$ is associated with the fracture 306. Similarly, the domain function $D_1$ is associated with the fracture 302, the domain function $D_2$ is associated with the fracture 304, and the domain function $D_3$ is associated with the fracture 306. In the jump functions $H_1$, $H_2$, and $H_3$ and domain functions $D_1$, $D_2$, and $D_3$, the truncated first fracture 312 is associated with fracture 302, the truncated second fracture 314 is associated with fracture 304, and the truncated third fracture 316 is associated with fracture 306. The jump function $H_3$ for fracture 306 extends its influence beyond the fracture 304. The influence may be curtailed by the domain function $D_3$.

The solution u has a different value in each of the sub-element domains. The terms involving integration over each element in equation (e3) may be evaluated separately in each sub-element domain. The details of partitioning a mesh element into sub-elements is described further below.

To provide tracking fractures operations, the level set functions may be used to track growing fractures. Once level set functions are defined, elements are explicitly split to facilitate the numerical integration involved in equation (e3).

Figure 4:
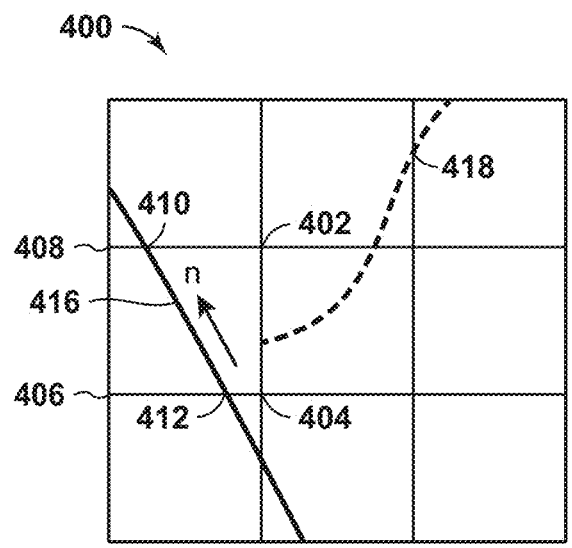
FIG. 4 is a diagram of nodal level set values defined for two intersecting fractures.

To provide tracking fractures using level set function operations, each fracture may be associated with a level set function. By way of example, FIG. 4 is a diagram 400 of nodal level set values defined for two intersecting fractures 416 and 418. The diagram 400 includes various nodes, such as nodes 402, 404, 406, and 408. To lessen storage, the nodal value of each level set function is defined only on the nodes of the mesh elements that are intersected by fractures. In diagram 400, the nodal level set values are defined for the two intersecting fractures 416 and 418. Some nodes may have multiple values stored for different level set functions.

To grow or initiate fractures, nodal values of level set function may be assigned to new nodes, such as nodes 410 and 412, in fractured mesh elements, which form sub-regions within the respective mesh elements. In the event of fracture initiation in a mesh element, the nodal values of the level set function of that mesh element may be assigned as the signed distance function to the plane centered at the mesh element center and with the direction based on the stress condition. For example, if the fracture initiation condition predicts a fracture opening direction perpendicular to n, the level set function values may be assigned as equation (e7):

$$\phi_i = (x_i - x_c) \cdot n \quad (e7)$$

where $\phi_i$ is the level set function of the node i, and $x_c$ is the location of the mesh element center.

When a fracture needs to grow into a new mesh element, the level set function is updated using global schemes. For example, one technique may involve that described in Jager. See, e.g., Jager, P., Steinmann, P., Kuhl, E., 2008, *Modeling three-dimensional crack propagation—A comparison of crack path tracking strategies*, Int. J. Numer. Methods Eng. 76, p. 1328 to 1352. In diagram 400, the surface on the right needs to grow the level set function values into the cell surrounded by nodes 402, 404, 406, and 408. Before level set updating, the front of the right fracture arrived at mesh element edge between nodes 402 and 404. The level set function values have been computed for nodes 402 and 404, but not nodes 406 and 408. The objective is to define the level set function values for nodes 406 and 408. To achieve the objective, the following equations (e8) and (e9) are solved using the finite element method in the cell as shown below:

$$\nabla \cdot (K \nabla \phi) = 0 \qquad (e8)$$

where $$K = I - n \otimes n \qquad (e9)$$

where n is the normal direction of the propagation of the fracture in the new mesh element. Thus, the normal direction n of surface S at the cell edge between nodes 402 and 404. $\phi$ is the level set function to be sought, while I is the identity tensor. The above differential equation (e9) can be solved with the boundary condition specified at nodes 402 and 404. The finite element procedure may yield level set function values at nodes 406 and 408.

Figure 5:
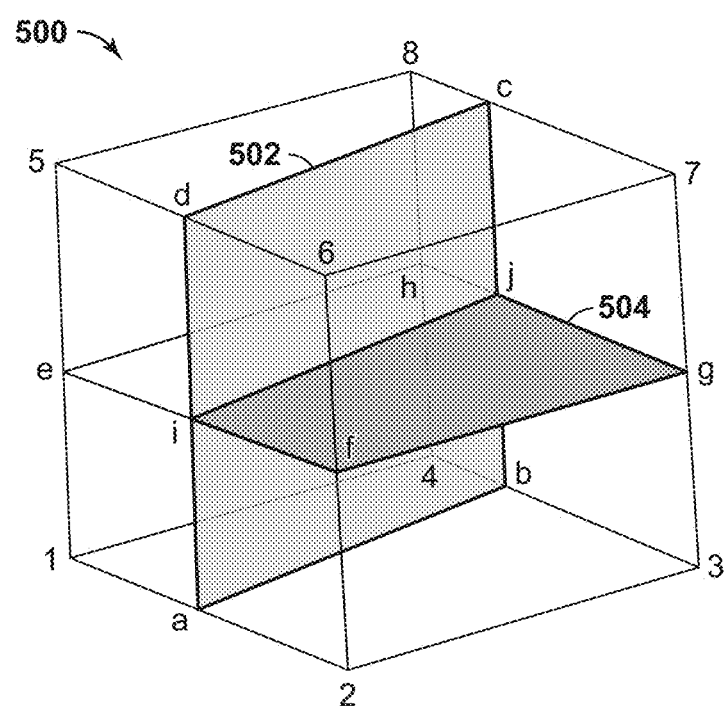
FIG. 5 is a diagram of an exemplary mesh element intersected by a vertically oriented fracture and then a horizontally oriented fracture.

To provide the partition elements for integration operation, mesh elements that are intersected by the fractures need to be partitioned by fractures to perform the integration in equation (e3). This step is performed after the level set function values are available. By way of example, FIG. 5 is a diagram 500 of an exemplary element intersected by a vertically oriented fracture 502 and then a horizontally oriented fracture 504. In this diagram 500, the nodal level set function values for the fracture 502 are $f_1=-1$, $f_2=1$, $f_3=1.3$, $f_4=-0.7$, $f_5=-1$, $f_6=1$, $f_7=1.3$, and $f_8=-0.7$. The nodal level set function values for the fracture 504 are $f_1=f_2=f_3=f_4=-1$, and $f_5=f_6=f_7=f_8=1$. Fracture 502 splits the mesh element into two sub-elements with the nodes at 1-4-8-5-a-b-c-d and 2-3-7-6-a-b-c-d, respectively. Fracture 504 may then further split the latter into sub-elements with nodes 2-3-f-g-a-i-j-b and 6-7-g-f-c-j-i-d. Integration may be performed on each of the four polyhedron because the jump and domain functions have different values in each of them.

Figure 6:
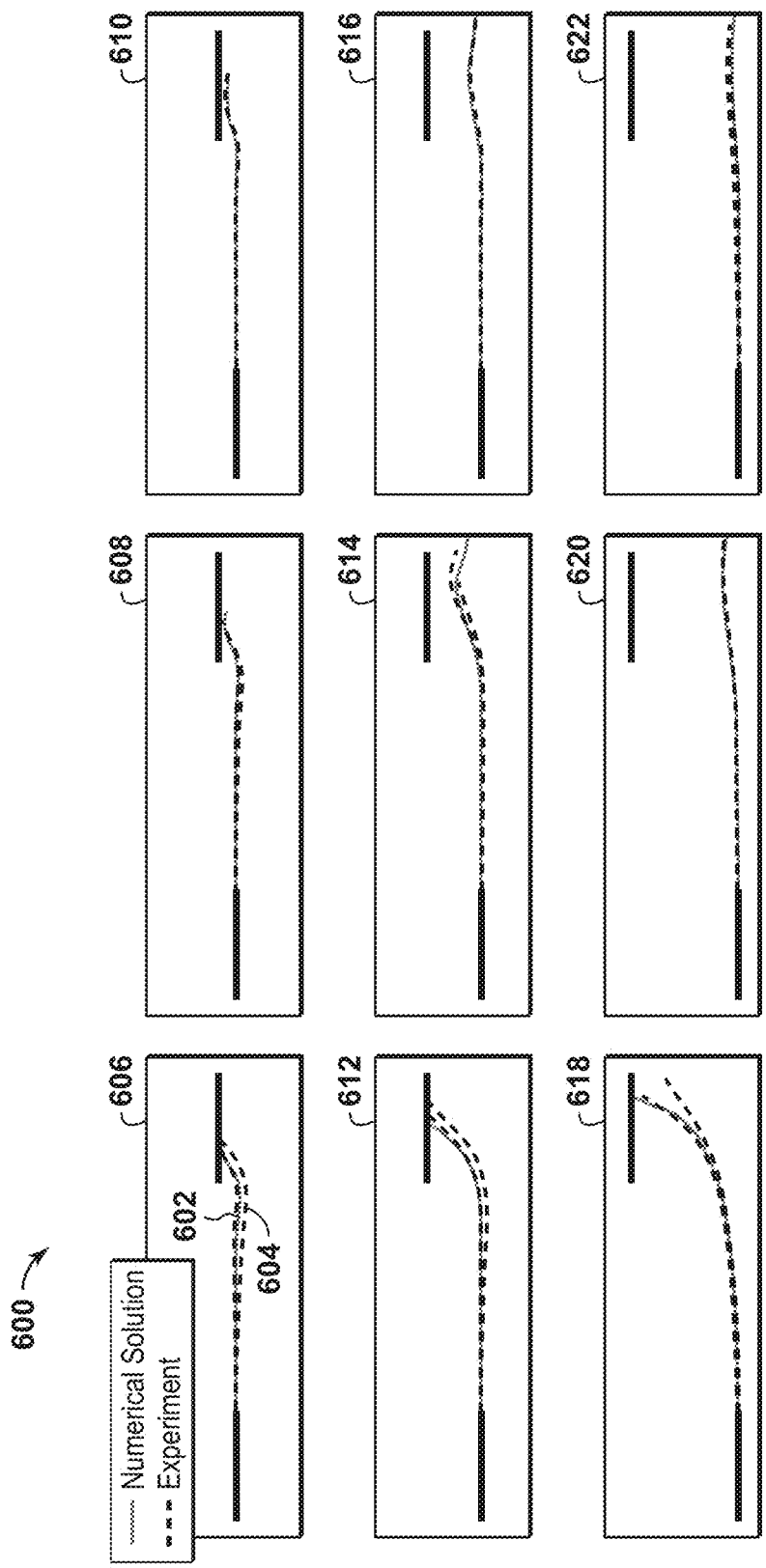
FIG. 6 is an exemplary diagram of simulation results comparison between the numerical solution and experiment.

FIG. 6 is an exemplary diagram 600 of simulation results comparison between the numerical solution and experiment. In this diagram 600, the simulation results comparison between the numerical solution and experiment in Thomas and Pollard. See, e.g., *The geometry of echelon fractures in rock: implications from laboratory and numerical experiments*, Journal of Structural Geology, Vol. 15, No. 3 to 5 pp. 323 to 334 (1993). The numerical solution is shown in a response surface 602, which is the solid line, while the experimental response surface 604 is shown in the dashed line. The experimental response surface 604 may include two dashed lines for certain diagrams, which represents a range of values that bound the results from the experiments. In each of the different diagrams 606 to 622, the comparison of the response 602 and 604 is shown. The comparison indicates that the numerical solution may accurately track the fracture re-orientation as observed in experiments.

To perform results gathering operations, fracture characterization involves the information concerning fracture density, orientation, and interconnectivity. Because all the fracture geometry are explicitly recorded in the partition elements for integration operation, such information should not be different to render from the simulation result.

In addition to output geometries, the fracture geometries may be output and perform a flow simulation on the zone and obtain effective permeability for the simulated zone.

Fracture characterization workflows based on the numerical evaluation may provide various enhancements. The numerical evaluation may be used in situations where input data is uncertain. To manage the uncertainty, the workflows may be devised to provide a probabilistic description of the natural fracture characterization. Examples of such workflows are exemplified below.

If no well has been drilled and no core or well test data exists to validate the natural fracture prediction, a probability distribution of the inputs may be estimated by expert or through an analog. By sampling the probability space and then performing a numerical evaluation for each set of sample input, a probabilistic description of the natural fracture characterization may be generated.

If wells have been drilled and core sample, image log, and drill stem tests may provide indications of fracture characterization, these data can be used to narrow down probability distribution of the inputs and generate a natural fracture characterization with higher certainty.

By way of example, FIGS. 7A and 7B are exemplary diagrams associated with partial results of a series of fracture simulation for a zone. In the diagrams 700 and 720, the partial results of a series of fracture simulation for a zone where data is available is shown in representations 704 to 712, which is shown as increasing in tensile strength chart 702. The representations 704 to 712 are increasing in tensile strength from 10 MegaPascal (MP), 20 MP, 30 MP, 40 MP and 45 MP. The partial results of a series of fracture simulation for a zone where data is available is shown in representations 724 to 732, which is shown as increasing in bonding stiffness chart 722. The representations 724 to 732 are increasing in bonding stiffness from $10E^{-2}$, $10E^{-1}$, E, 10E and 100E, where E is the rock's stiffness. The workflow samples a certain distribution of inputs such as tensile strength and bonding stiffness between layers. The predictions that match data observation may be preserved and the set of inputs which are used to generate those matching data observation are treated as possible inputs for simulations at zones in the same layer away from the calibration zone.

Persons skilled in the technical field will readily recognize that in practical applications of the disclosed methodology, it is partially performed on a computer, typically a suitably programmed digital computer. Further, some portions of the detailed descriptions which follow are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "processing" or "computing", "calculating", "comparing", "determining", "displaying", "copying," "producing," "storing," "adding," "applying," "executing," "maintaining," "updating," "creating," "constructing" "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Embodiments of the present techniques also relate to an apparatus for performing the operations herein. This apparatus may be specially constructed for the required purposes, or it may comprise a general-purpose computer selectively activated or reconfigured by a computer program stored in the computer (e.g., one or more sets of instructions). Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), magnetic disk storage media, optical storage media, flash memory devices, etc.), and a machine (e.g., computer) readable transmission medium (electrical, optical, acoustical or other form of propagated signals (e.g., carrier waves, infrared signals, digital signals, etc.)).

Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present techniques are in no way limited to implementation in any specific operating system or environment.

By way of example, a simplified representation for subsurface structures is utilized to create subsurface models, which may be used in hydrocarbon operations. Thus, the present techniques may be used to enhance construction of subsurface models, which may be used for hydrocarbon operations and, more particularly, to subsurface modeling. For a subsurface model, a structural framework is created from subsurface measurements. The structural framework may include various objects, such as faults, faults, horizons, and if necessary, one or more surfaces that bound the area of interest. The different objects are meshed to define closed volumes (e.g., zones, compartments, or subvolumes). Then, the closed volumes may be partitioned into small cells defined by the grid. Finally, properties are assigned to cells or objects (e.g., surface transmissibility) and individual cells (e.g., rock type and/or porosity) in the structural framework to form the subsurface model. The subsurface model may be upscaled to perform a simulation.

The present techniques may be utilized to enhance the creation of a subsurface model. The subsurface model, which may include a reservoir model, geomechanical model, or geologic model, is a computerized representation of a subsurface region based on geophysical and geological observations associated with at least a portion of the specified subsurface region. Subsurface models, such as reservoir models, are typically used as input data for reservoir simulators or reservoir simulation programs that compute predictions for the behavior of rocks and fluids contained within a subsurface region under various scenarios of hydrocarbon recovery. Using subsurface models in simulations provides a mechanism to identify which recovery options offer the most economic, efficient, and effective development plans for a subsurface region (e.g., a particular reservoir and/or field).

Construction of a subsurface model is typically a multi-step process. Initially, a structural model or structural framework is created from objects (e.g., surfaces, such as faults, horizons, and if necessary, additional surfaces that bound the area of interest for the model). The different objects define closed volumes, which may be referred to as zones, subvolumes, compartments and/or containers. Then, each zone is meshed or partitioned into sub-volumes (e.g., cells, mesh elements or voxels) defined by a mesh (e.g., a 3-D mesh or 3-D grid). Once the partitioning is performed, properties are assigned to objects (e.g., transmissibility) and individual sub-volumes (e.g., rock type, porosity, permeability, rock compressibility, or oil saturation). The objects (e.g., surfaces) are represented as meshes, while the cells form a mesh.

The assignment of cell properties is often also a multistep process where cells are assigned properties. The properties may be assigned in the creation of the subsurface model and/or the creation of the multi-layer model. For example, each cell may first be assigned a rock type, and then each rock type is assigned spatially-correlated reservoir properties and/or fluid properties. Each cell in the subsurface model may be assigned a rock type. The distribution of the rock types within the subsurface model may be controlled by several methods, including map boundary polygons, rock type probability maps, or statistically emplaced based on concepts. Further, the assignment of properties, such as rock type assignments, may be conditioned to well data.

Further, the reservoir properties may include reservoir quality parameters, such as porosity and permeability, but may include other properties, such as clay content, cementation factors, and other factors that affect the storage and deliverability of fluids contained in the pores of the rocks. Geostatistical techniques may be used to populate the cells with porosity and permeability values that are appropriate for the rock type of each cell. Rock pores are saturated with groundwater, oil or gas. Fluid saturations may be assigned to the different cells to indicate which fraction of their pore space is filled with the specified fluids. Fluid saturations and other fluid properties may be assigned deterministically or geostatistically.

Geostatistics interpolates observed data and superimposes an expected degree of variability. As an example, kriging, which uses the spatial correlation among data and intends to construct the interpolation via semi-variograms, may be used. To reproduce more realistic spatial variability and help assessing spatial uncertainty between data, geostatistical simulation is often used, for example based on variograms, training images, or parametric geological objects. Perturbing surface properties or cell properties, such as rock type, reservoir properties or fluid properties, is a conventional process, which may utilize deterministic or geostatistical methods to assign them. The assignment may include choosing a different variogram for kriging or a different seed for geostatistical simulation.

Figure 8:
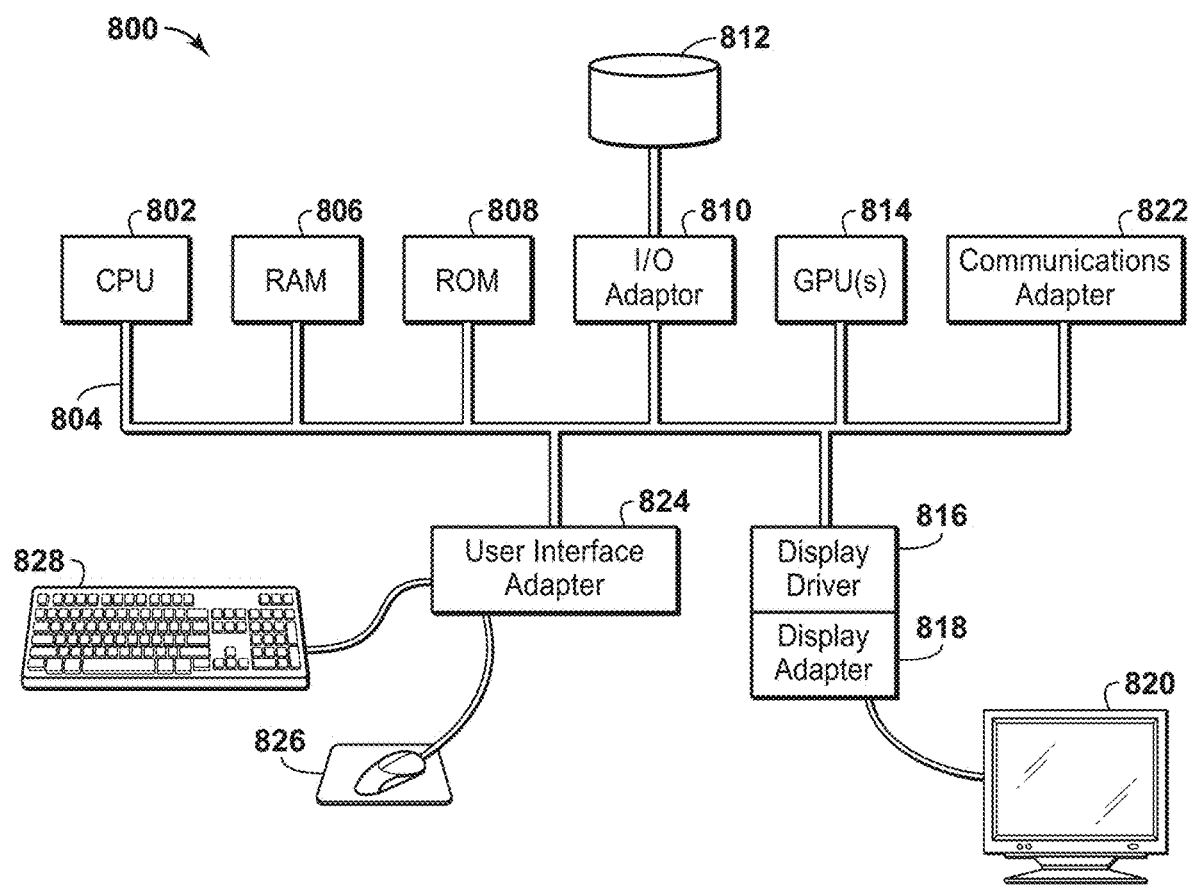
FIG. 8 is a block diagram of a computer system that may be used to perform any of the methods disclosed herein.

Further, one or more embodiments may include methods that are performed by executing one or more sets of instructions to perform modeling enhancements in various stages. For example, FIG. 8 is a block diagram of a computer system 800 that may be used to perform any of the methods disclosed herein. A central processing unit (CPU) 802 is coupled to system bus 804. The CPU 802 may be any general-purpose CPU, although other types of architectures of CPU 802 (or other components of exemplary system 800) may be used as long as CPU 802 (and other components of system 800) supports the inventive operations as described herein. The CPU 802 may execute the various logical instructions according to disclosed aspects and methodologies. For example, the CPU 802 may execute machine-level instructions for performing processing according to aspects and methodologies disclosed herein.

The computer system 800 may also include computer components such as a random access memory (RAM) 806, which may be SRAM, DRAM, SDRAM, or the like. The computer system 800 may also include read-only memory (ROM) 808, which may be PROM, EPROM, EEPROM, or the like. RAM 806 and ROM 808 hold user and system data and programs, as is known in the art. The computer system 800 may also include an input/output (I/O) adapter 810, a graphical processing unit (GPU) 814, a communications adapter 822, a user interface adapter 824, and a display adapter 818. The I/O adapter 810, the user interface adapter 824, and/or communications adapter 822 may, in certain aspects and techniques, enable a user to interact with computer system 800 to input information.

The I/O adapter 810 preferably connects a storage device (s) 812, such as one or more of hard drive, compact disc (CD) drive, floppy disk drive, tape drive, etc. to computer system 800. The storage device(s) may be used when RAM 806 is insufficient for the memory requirements associated with storing data for operations of embodiments of the present techniques. The data storage of the computer system 800 may be used for storing information and/or other data used or generated as disclosed herein. The communications adapter 822 may couple the computer system 800 to a network (not shown), which may enable information to be input to and/or output from system 800 via the network (for example, a wide-area network, a local-area network, a wireless network, any combination of the foregoing). User interface adapter 824 couples user input devices, such as a keyboard 828, a pointing device 826, and the like, to computer system 800. The display adapter 818 is driven by the CPU 802 to control, through a display driver 816, the display on a display device 820. Information and/or representations of one or more 2D canvases and one or more 3D windows may be displayed, according to disclosed aspects and methodologies.

The architecture of system 800 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

As may be appreciated, the method may be implemented in machine-readable logic, such that a set of instructions or code that, when executed, performs the instructions or operations from memory. By way of example, the computer system includes a processor; an input device and memory. The input device is in communication with the processor and is configured to receive input data associated with a subsurface region. The memory is in communication with the processor and the memory has a set of instructions, wherein the set of instructions, when executed, are configured to: obtain a subsurface model associated with a subsurface region; identify a zone in the subsurface model for fracture characterization; create a multi-layer model for the selected zone; apply loads (e.g., macromechanical geological loads) to the multi-layer model; simulate the multi-layer model based on the loads to represent the fracture characterization (e.g., fracture generation, fracture interaction, fracture intersection and any combination thereof); and output the fracture characterization results from the simulation for the zone.

In certain configurations, the set of instructions may be configured to: obtain a subsurface model associated with a subsurface region from memory; identify a zone in the subsurface model for fracture characterization; create a multi-layer model for the selected zone; determine macromechanical geological loads to be applied to the multi-layer model; simulate the multi-layer model based on the macromechanical geological loads to represent fracture generation, which includes fracture interaction and fracture intersection; and output the fracture characterization results from the simulation of the multi-layer model, wherein the fracture characterization results comprises one of fracture density, fracture orientation, fracture location, fracture geometry, fracture aperture, effective permeability, fracture connectivity, and any combination thereof. The set of instructions, when executed by the processor, may also be configured to simulate fluid flow in the subsurface model using the fracture characterization results. Further still, the set of instructions may be configured to: define the zone for numerical evaluation; separate the multi-layer model into one or more stratigraphic layers; construct a mesh for the zone, wherein the mesh partitions the zone into various mesh elements; and assign material constitutive relationships for each of the stratigraphic layers and properties to the mesh elements.

In yet other configurations, the set of instructions, when executed by the processor, may be configured to perform a plurality of loading steps, wherein each loading step is configured to: (i) solve one or more conservation of linear momentum equations associated with the zone; (ii) determine if the solution for the conservation of linear momentum equations for any mesh elements in the multi-layer model exceed a fracture initiation or propagation criterion; (iii) if the solution for the conservation of linear momentum equations of the mesh elements does not exceed the fracture initiation or propagation criterion, continue to step (v); (iv) if the solution for the conservation of linear momentum equations of the mesh elements exceed the fracture initiation or propagation criterion, (a) select the mesh element associated with the solution for the conservation of linear momentum equations that exceeds the fracture initiation or propagation criterion by the largest absolute value as the mesh element to fracture; (b) determine fracture surface direction in the mesh element to be fractured based on fracture growth direction criteria; (c) calculate one or more level set values based on the fracture surface direction; (d) determine sub-regions for the mesh element based on the one or more level set values; and (e) repeat step (i) using the determined sub-regions to represent the mesh element; and (v) store the fracture characterization results for the loading step in memory. In other configurations, the set of instructions may be configured to cluster the mesh elements that have a solution that exceeds the fracture initiation or propagation criterion. Then, the grouped or clustered mesh elements may be used to perform the steps of a) to e) for each of the respective clusters, which may be performed in parallel or concurrently to lessen the computational time.

It should be understood that the preceding is merely a detailed description of specific embodiments of the invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. As such, it will be apparent, however, to one skilled in the art, that many modifications and variations to the embodiments described herein are possible. All such modifications and variations are intended to be within the scope of the present invention, as defined by the appended claims.

The invention claimed is:

1. A method for characterizing fractures for a subsurface region comprising:
   obtaining a subsurface model associated with a subsurface region;
   identifying a zone in the subsurface model for fracture characterization;
   creating a multi-layer model for the selected zone;
   determining macromechanical geological loads to be applied to the multi-layer model, wherein the macromechanical geological loads represent stresses or displacements for a region that is larger than the selected zone;
   simulating the multi-layer model based on the macromechanical geological loads to represent fracture generation, which includes fracture interaction and fracture intersection; and
   outputting fracture characterization results from the simulation of the multi-layer model, wherein the fracture characterization results comprises one of fracture density, fracture orientation, fracture location, fracture geometry, fracture aperture, effective permeability, fracture connectivity, and any combination thereof.

2. The method of claim 1, wherein creating the multi-layer model comprises:
   (i) defining the zone for numerical evaluation;
   (ii) separating the multi-layer model into one or more stratigraphic layers;
   (iii) constructing a mesh for the zone, wherein the mesh partitions the zone into various mesh elements; and
   (iv) assigning material constitutive relationships for each of the stratigraphic layers and assigning properties to the mesh elements.

3. The method of claim 1, wherein simulating the multi-layer model based on the macromechanical geological loads represents generation of natural fractures.

4. The method of claim 1, wherein the multi-layer model is seeded with one or more fractures prior to simulating the multi-layer model based on the macromechanical geological loads.

5. The method of claim 1, wherein identifying the zone in the subsurface model is based on locations associated with measured data.

6. The method of claim 5, wherein the measured data comprises core sample data, image logs, mini fracture test data, drill stem test data, and any combination thereof.

7. The method of claim 1, wherein simulating the multi-layer model based on the macromechanical geological loads comprises performing a plurality of loading steps, wherein each loading step comprises:
   (i) solving one or more conservation of linear momentum equations associated with the zone;
   (ii) determining if the solution for the conservation of linear momentum equations for any mesh elements in the multi-layer model exceed a fracture initiation or propagation criterion;
   (iii) if the solution for the mesh elements does not exceed the fracture initiation or propagation criterion, continuing to step (v);
   (iv) if the solution for any of the mesh elements exceeds the fracture initiation or propagation criterion, the method further comprises:
      a. selecting the mesh element associated with the solution for the conservation of linear momentum equations that exceeds the fracture initiation or propagation criterion by the largest absolute value as the mesh element to fracture;
      b. determining fracture surface direction in the mesh element to be fractured based on fracture growth direction criteria;
      c. calculating one or more level set values based on the fracture surface direction;
      d. determining sub-regions for the mesh element based on the one or more level set values; and
      e. repeating to step (i) using the determined sub-regions to represent the mesh element; and
   (v) storing the fracture characterization results for the loading step.

8. The method of claim 7, wherein solving of conservation of linear momentum equation comprises solving the expression:

$$\nabla \cdot \sigma + \rho g = 0$$

where g is gravity, $\rho$ is rock density, and $\sigma$ is total stress.

9. The method of claim 7, wherein the solving of the conservation of linear momentum equation includes an enrichment term to capture discontinuities associated with displacements in the zone.

10. The method of claim 9, wherein solving of conservation of linear momentum equation comprises solving the expression:

$$u^h(x) = \sum_{i=1}^{N^e} N_i(x) u_i + \sum_{k=1}^{N^f} \sum_{i=1}^{N^e} N_i(x) a_i^k (H_k(x) - H_k(x_i)) D_k(x)$$

where $u^h$ is interpolation of displacement, k is the fracture, $H_k$ is the jump function for the fracture k, $D_k$ is a domain function for the fracture k, $N^e$ is number of nodes in the mesh element, i is the node, x is the location, $x_i$ is location of $i^{th}$ node, $u_i$ is displacement of the node i, $N^f$ is number of fractures, $a_i$ is enrichment unknown of the node i, and $N_i$ is the shape function of the node i.

11. The method of claim 7, further comprising clustering the mesh elements that have solutions that exceeds the fracture initiation or propagation criterion into two or more clusters and performing the steps a) to e) for each of the respective clusters independently.

12. The method of claim 1, further comprising adjusting the macromechanical geological loads by loading increments for each of a plurality of loading steps based on a comparison of the fracture characterization results with a threshold.

13. The method of claim 12, wherein the fracture characterization results include fracture density and the threshold is less than 10% of the fracture density.

14. The method of claim 12, wherein the loading increments comprise at least one coarse scale increment and at least one fine scale increment, wherein the at least one fine scale increment is smaller than the at least one coarse scale increment.

15. The method of claim 1, further comprising performing a simulation of the subsurface model using the fracture characterization results.

16. The method of claim 1, further comprising performing a hydrocarbon operation based on the fracture characterization results.

17. The method of claim 1, further comprising determining the macromechanical geological loads based on one of burial history, a global model that represents the tectonics of the zone, and any combination thereof.

18. A system for generating a subsurface model associated with a subsurface region, comprising:
   a processor;
   an input device in communication with the processor and configured to receive input data associated with a subsurface region;
   memory in communication with the processor, the memory having a set of instructions, wherein the set of instructions, when executed by the processor, are configured to:
      obtain a subsurface model associated with a subsurface region from memory;
      identify a zone in the subsurface model for fracture characterization;
      create a multi-layer model for the selected zone;
      determine macromechanical geological loads to be applied to the multi-layer model, wherein the macromechanical geological loads represent stresses or displacements for a region that is larger than the selected zone;
      simulate the multi-layer model based on the macromechanical geological loads to represent fracture generation, which includes fracture interaction and fracture intersection; and
      output the fracture characterization results from the simulation of the multi-layer model, wherein the fracture characterization results comprises one of fracture density, fracture orientation, fracture location, fracture geometry, fracture aperture, effective permeability, fracture connectivity, and any combination thereof.

19. The system of claim 18, wherein the set of instructions, when executed by the processor, are further configured to:
   define the zone for numerical evaluation;
   separate the multi-layer model into one or more stratigraphic layers;
   construct a mesh for the zone, wherein the mesh partitions the zone into various mesh elements; and
   assign material constitutive relationships for each of the stratigraphic layers and properties to the mesh elements.

20. The system of claim 18, wherein the set of instructions, when executed by the processor, are further configured to perform a plurality of loading steps, wherein each loading step is configured to:
   (i) solve one or more conservation of linear momentum equations associated with the zone;
   (ii) determine if the solution for the conservation of linear momentum equations for any mesh elements in the multi-layer model exceed a fracture initiation or propagation criterion;
   (iii) if the solution for the conservation of linear momentum equations of the mesh elements does not exceed the fracture initiation or propagation criterion, continue to step (v);
   (iv) if the solution for the conservation of linear momentum equations of the mesh elements exceed the fracture initiation or propagation criterion,
      a. select the mesh element associated with the solution for the conservation of linear momentum equations that exceeds the fracture initiation or propagation criterion by the largest absolute value as the mesh element to fracture;
      b. determine fracture surface direction in the mesh element to be fractured based on fracture growth direction criteria;
      c. calculate one or more level set values based on the fracture surface direction;
      d. determine sub-regions for the mesh element based on the one or more level set values; and
      e. repeat step (i) using the determined sub-regions to represent the mesh element; and
   (v) store the fracture characterization results for the loading step in memory.

21. The system of claim 18, wherein the set of instructions, when executed by the processor, are further configured to simulate fluid flow in the subsurface model using the fracture characterization results.

* * * * *